United States Patent
Fritz et al.

(10) Patent No.: US 11,774,965 B2
(45) Date of Patent: Oct. 3, 2023

(54) SLIPFORM PAVER AND METHOD FOR OPERATING A SLIPFORM PAVER

(71) Applicant: Wirtgen GmbH, Windhagen (DE)

(72) Inventors: Matthias Fritz, Hennef (DE); Stefan Wagner, Bad Honnef (DE); Cyrus Barimani, Königswinter (DE)

(73) Assignee: Wirtgen GmbH

( * ) Notice: Subject to any disclaimer, the term of this patent is extended or adjusted under 35 U.S.C. 154(b) by 830 days.

(21) Appl. No.: 16/528,977

(22) Filed: Aug. 1, 2019

(65) Prior Publication Data
US 2020/0057444 A1    Feb. 20, 2020

(30) Foreign Application Priority Data
Aug. 16, 2018   (DE) ..................... 10 2018 119 962.7

(51) Int. Cl.
*G05D 1/00* (2006.01)
*B62D 11/00* (2006.01)
(Continued)

(52) U.S. Cl.
CPC ......... *G05D 1/0088* (2013.01); *B62D 11/003* (2013.01); *B62D 11/20* (2013.01);
(Continued)

(58) Field of Classification Search
CPC .. G05D 1/0088; G05D 1/0212; G05D 1/0278; G05D 2201/0202; B62D 11/003;
(Continued)

(56) References Cited

U.S. PATENT DOCUMENTS

| 4,065,856 A | 1/1978 | Waters |
| 5,245,422 A | 9/1993 | Borcherts et al. |

(Continued)

FOREIGN PATENT DOCUMENTS

| DE | 19640282 A1 | 4/1997 |
| DE | 19750315 A1 | 5/1998 |

(Continued)

OTHER PUBLICATIONS

M. A. Ardestani and M. Asgari, "Modeling and analysis of a novel 3-DoF spatial parallel robot," 2012 19th International Conference on Mechatronics and Machine Vision in Practice (M2VIP), 2012, pp. 162-167. (Year: 2012).*

(Continued)

*Primary Examiner* — Maceeh Anwari
(74) *Attorney, Agent, or Firm* — Gary L. Montle; Lucian Wayne Beavers; Patterson Intellectual Property Law, PC

(57) ABSTRACT

The invention relates to a self-propelled construction machine and to a method for controlling a self-propelled construction machine. The construction machine according to the invention has a position-determining device 13 for determining the position of a reference point R on the construction machine in a coordinate system (X, Y, Z) independent of the construction machine. The position-determining device has a navigation satellite system receiver 14 for receiving satellite signals from a global navigation satellite system 15 (GNSS) and a computing unit 16 which is configured so that the position of a reference point (R) on the construction machine and the orientation (ψ) of the construction machine can be determined based on the satellite signals in a coordinate system (X, Y, Z) that is independent of the construction machine. Moreover, the construction machine has a controller 18 which cooperates with the position-determining device 13 configured to adjust (Continued)

the steering angles of the steerable running gears 3, 4, 6 so that the reference point R of the construction machine moves along a set trajectory T. The computing unit 16 of the position-determining device 13 is configured so that, in a control mode in which the control of the construction machine is not based on the satellite signals of the global navigation satellite system 15, the position ($x_n$, $y_n$, $z_n$) of the reference point (R) relating to the construction machine and the orientation ($\psi$) of the construction machine are determined in the coordinate system (X, Y, Z) that is independent of the construction machine while the construction machine is moving on the basis of a kinematic model 16A implemented in the computing unit 16 of the position-determining device 13 which describes the position (P) of the reference point (R) and the orientation ($\psi$) in the coordinate system (X, Y, Z) that is independent of the construction machine depending on the steering angles and the speeds of the running gears 3, 4, 6.

20 Claims, 10 Drawing Sheets

(51) Int. Cl.
| | | |
|---|---|---|
| *B62D 11/20* | (2006.01) | |
| *E01C 19/48* | (2006.01) | |
| *E01C 23/088* | (2006.01) | |
| *G05D 1/02* | (2020.01) | |

(52) U.S. Cl.
CPC ...... *E01C 19/4873* (2013.01); *E01C 19/4893* (2013.01); *E01C 23/088* (2013.01); *G05D 1/0212* (2013.01); *G05D 1/0278* (2013.01); *G05D 2201/0202* (2013.01)

(58) Field of Classification Search
CPC . B62D 11/20; E01C 19/4873; E01C 19/4893; E01C 23/088; E01C 19/004; E01C 19/00; E01C 19/48; E01C 19/4886; E21C 47/00; G01C 21/14; G01C 21/165; G01S 19/49
See application file for complete search history.

(56) References Cited

U.S. PATENT DOCUMENTS

| | | |
|---|---|---|
| 5,288,167 A | 2/1994 | Gaffard et al. |
| 5,519,620 A | 5/1996 | Talbot et al. |
| 5,546,123 A | 8/1996 | Ikeda et al. |
| 5,549,412 A | 8/1996 | Malone |
| 5,612,864 A | 3/1997 | Henderson |
| 5,631,658 A | 5/1997 | Gudat et al. |
| 5,721,685 A | 2/1998 | Holland et al. |
| 5,752,207 A | 5/1998 | Sarangapani |
| 5,838,277 A | 11/1998 | Loomis et al. |
| 5,929,807 A | 7/1999 | Viney et al. |
| 6,027,282 A | 2/2000 | Horn |
| 6,047,227 A | 4/2000 | Henderson et al. |
| 6,074,693 A | 6/2000 | Manning |
| 6,088,644 A | 7/2000 | Brandt et al. |
| 6,113,309 A | 9/2000 | Hollon et al. |
| 6,140,957 A | 10/2000 | Wilson et al. |
| 6,144,318 A | 11/2000 | Hayashi et al. |
| 6,152,648 A | 11/2000 | Gfroerer et al. |
| 6,191,732 B1 | 2/2001 | Carlson et al. |
| 6,287,048 B1 | 9/2001 | Hollon et al. |
| 6,307,959 B1 | 10/2001 | Mandelbaum et al. |
| 6,371,566 B1 | 4/2002 | Haehn |
| 6,425,186 B1 | 7/2002 | Oliver |
| 6,481,924 B1 | 11/2002 | Smolders et al. |
| 6,553,299 B1 | 4/2003 | Keller et al. |
| 6,655,465 B2 | 12/2003 | Carlson et al. |
| 6,736,216 B2 | 5/2004 | Savard et al. |
| 6,769,836 B2 | 8/2004 | Lloyd |
| 6,916,070 B2 | 7/2005 | Sehr |
| 6,950,059 B2 | 9/2005 | Rapoport et al. |
| 6,963,657 B1 | 11/2005 | Nishigaki et al. |
| 7,002,513 B2 | 2/2006 | Brabec et al. |
| 7,029,199 B2 | 4/2006 | Mayfield et al. |
| 7,068,815 B2 | 6/2006 | Chang et al. |
| 7,363,154 B2 | 4/2008 | Lindores |
| 7,399,139 B2 | 7/2008 | Kieranen et al. |
| 7,443,167 B2 | 10/2008 | Siegel et al. |
| 7,491,014 B2 | 2/2009 | Sick |
| 7,510,347 B2 | 3/2009 | Lemke |
| 7,530,641 B2 | 5/2009 | Berning et al. |
| 7,617,061 B2 | 11/2009 | Brabec |
| 7,643,923 B2 | 1/2010 | Buehlmann et al. |
| 7,856,302 B2 | 12/2010 | Rasmussen |
| 7,865,285 B2 | 1/2011 | Price et al. |
| 7,946,787 B2 | 5/2011 | Glee et al. |
| 7,946,788 B2 | 5/2011 | Jurasz et al. |
| 8,018,376 B2 | 9/2011 | McClure et al. |
| 8,047,741 B2 | 11/2011 | Von Schnebeck et al. |
| 8,174,437 B2 | 5/2012 | Whitehead |
| 8,246,270 B2 | 8/2012 | Berning et al. |
| 8,271,194 B2 | 9/2012 | Whitehead et al. |
| 8,388,263 B2 | 3/2013 | Fritz et al. |
| 8,412,418 B2 | 4/2013 | Kumagai et al. |
| 8,613,566 B2 | 12/2013 | Fritz et al. |
| 8,676,508 B2 | 3/2014 | Schwarz |
| 8,700,324 B2 | 4/2014 | Halder |
| 8,794,868 B2 | 8/2014 | Fritz |
| 8,977,442 B2 | 3/2015 | Menzenbach et al. |
| 8,989,968 B2 | 3/2015 | Fritz et al. |
| 9,002,565 B2 | 4/2015 | Jones et al. |
| 9,036,865 B2 | 5/2015 | Haas et al. |
| 9,096,977 B2 | 8/2015 | Fritz et al. |
| 9,347,185 B2 | 5/2016 | Reda |
| 9,896,810 B2 | 2/2018 | Berning et al. |
| 9,963,836 B1* | 5/2018 | Brenner ............... G01B 17/06 |
| 10,354,228 B2 | 7/2019 | Paulsen et al. |
| 2004/0057795 A1 | 3/2004 | Mayfield et al. |
| 2004/0193348 A1 | 9/2004 | Gray et al. |
| 2008/0208417 A1 | 8/2008 | Buehlmann et al. |
| 2008/0253834 A1 | 10/2008 | Colvard |
| 2009/0016818 A1 | 1/2009 | Hall et al. |
| 2010/0023229 A1 | 1/2010 | Chiocco |
| 2011/0150572 A1 | 6/2011 | Fritz et al. |
| 2011/0202225 A1* | 8/2011 | Willis ................. G01C 21/165 |
| | | 702/85 |
| 2011/0206456 A1 | 8/2011 | Jurasz et al. |
| 2011/0229264 A1 | 9/2011 | Weiser |
| 2011/0231061 A1* | 9/2011 | Reeve ................... G05D 1/027 |
| | | 701/41 |
| 2012/0001621 A1 | 1/2012 | Hall et al. |
| 2012/0001638 A1 | 1/2012 | Hall et al. |
| 2012/0101725 A1 | 4/2012 | Kondekar |
| 2012/0301220 A1 | 11/2012 | Snoeck et al. |
| 2013/0041549 A1* | 2/2013 | Reeve ................. G05D 1/0272 |
| | | 701/28 |
| 2014/0081532 A1 | 3/2014 | Fritz et al. |
| 2015/0176990 A1 | 6/2015 | Fritz et al. |
| 2016/0060826 A1 | 3/2016 | Berning et al. |
| 2017/0108867 A1* | 4/2017 | Franzius ............. G05D 1/0219 |
| 2019/0351941 A1 | 11/2019 | Takumi |

FOREIGN PATENT DOCUMENTS

| | | |
|---|---|---|
| DE | 29918747 U1 | 3/2000 |
| DE | 69131837 T2 | 6/2000 |
| DE | 102010014695 A1 | 10/2011 |
| DE | 102010048185 A1 | 4/2012 |
| DE | 102011106139 A1 | 12/2012 |
| EP | 1103659 A2 | 5/2001 |
| EP | 1118713 A1 | 7/2001 |
| EP | 2336424 A2 | 6/2011 |
| EP | 2719829 A1 | 4/2014 |
| JP | 5555367 B1 | 7/2014 |
| JP | 2018075946 A | 5/2018 |
| WO | 9203701 A1 | 3/1992 |

(56) References Cited

FOREIGN PATENT DOCUMENTS

OTHER PUBLICATIONS

English translation of JP 2018-075946 A.
Qu, Zhihua: Cooperative Control of Dynamical Systems: Applications to Autonomous Vehicles. London: Springer—Verlag London Limited, 2009, S. 11-34.—ISBN 978-1-84882-324-2.
European Search Report of corresponding application No. 19190829.2, dated Jan. 20, 2020, 7 pages (not prior (art).

* cited by examiner

SLIPFORM PAVER AND METHOD FOR OPERATING A SLIPFORM PAVER

CROSS-REFERENCES TO RELATED APPLICATIONS

This application claims benefit of German Patent Application No. 10 2018 119 962.7, filed Aug. 16, 2018, and which is hereby incorporated by reference.

FIELD OF THE DISCLOSURE

The invention relates to a self-propelled construction machine with a machine frame driven by steerable and/or drivable running gears and to a method for controlling a self-propelled construction machine.

BACKGROUND

Self-propelled construction machines are characterised in that they possess work equipment arranged on a machine frame for building structures on a terrain or for altering the terrain. The known self-propelled construction machines include for example slipform pavers, road milling machines, recyclers, or surface miners.

In the case of road milling machines, recyclers, and surface miners, the work equipment comprises a milling drum equipped with milling or cutting tools, a milling/mixing rotor or a cutting roller with which material can be removed from the terrain. The work equipment of slipform pavers is a slipform, which is also referred to as a concrete trough. Structures of different shapes such as concrete barriers, ducts, gutters, or curbs can be produced by means of the concrete trough.

Self-propelled construction machines also possess a drive mechanism for performing translational and/or rotational movements of the construction machine in the terrain as well as a controller for actuating the drive mechanism.

In order to build structures on the terrain or to alter the terrain, the goal for self-propelled construction machines is a largely automatic control of the construction machine without any significant interventions by the vehicle driver. For the automatic control of the construction machine, the drive mechanism of the construction machine is controlled in such a way that a reference point on the construction machine moves along a set trajectory (target travel path), i.e. on the trajectory or at a set distance from the trajectory, in order to build a structure or alter the terrain.

A known method for controlling self-propelled construction machines requires the use of a guidewire with which the trajectory or an equidistant space to the trajectory is provided.

Self-propelled construction machines can also be controlled by using a total station for determination of a position or a global navigation satellite system (GNSS). Data describing the trajectory in the terrain is obtained for the automatic control of the construction machine Said data may be coordinates in a two- or three-dimensional coordinate system that is independent of the construction machine.

The control of the construction machine with a global navigation satellite system (GNSS) has proven itself in practice. This control of the construction machine nevertheless requires the reception of the satellite signals from the GNSS system. In practice, the reception of the satellite signals may be disrupted. For example, if the construction machine moves behind building coverings, under a bridge, or into a tunnel, the reception of the GNSS signal may be disrupted, which means that the GNSS can no longer determine the position of the construction machine. It is then no longer possible to control the construction machine by using the GNSS.

BRIEF SUMMARY

The invention is based on the objective to produce a self-propelled construction machine which is able to move along a trajectory with a high level of accuracy even if the reception of the satellite signals from the global navigation satellite system (GNSS) were to be disrupted. A further objective of the invention is to specify a method by means of which a self-propelled construction machine can be moved along a trajectory with a high level of accuracy even if the reception of the satellite signals from the GNSS were to be disrupted. The objective of the invention is, in particular, to ensure the control of a construction machine even in the case of a disruption of the reception of the satellite signals from the GNSS so that the construction machine does not have to be stopped.

According to the invention, these objectives are achieved by the features of the independent claims. The subject matters of the dependent claims relate to preferred embodiments of the invention.

The self-propelled construction machine according to the invention has a machine frame supported by running gears. Of the running gears, at least some, preferably all, are drivable and/or steerable running gears. The running gears may be crawler drives or wheels. The construction machine may be, for example, a road milling machine having a milling drum/cutting roller equipped with a milling/cutting tool, or the construction machine may be a slipform paver having a device for moulding flowable material, or the construction machine may be a road finisher having a paving screed for moulding material. The construction machine may also include devices for adjusting the height of the machine frame or of the work equipment with respect to the terrain surface such as lifting columns to which the running gears are attached.

The construction machine according to the invention further comprises a position-determining device for determining the position of a reference point on the construction machine in a coordinate system that is independent of the construction machine and the orientation of the construction machine in a coordinate system that is independent of the construction machine. The position-determining device has a navigation satellite system receiver for receiving satellite signals from a global navigation satellite system (GNSS) and a processor which is configured so that, on the basis of the satellite signals, the position of a reference point (R) on the construction machine, data describing the construction machine and the orientation of the construction machine, may be determined in a coordinate system (X, Y, Z) that is independent of the construction machine.

The position-determining device may be a component of a central controller of the construction machine on which a control program (software) runs in order to actuate the individual components or assemblies of the construction machine. For example, the position-determining device may contain a programmable logic controller (PLC) which may comprise a microcontroller.

In addition, the construction machine has a controller which collaborates with the position-determining device and which is configured to adjust the steering angles of the steerable running gears so that the reference point (R) of the construction machine moves along a set trajectory (T) which can be described by, for example, Cartesian coordinates in a Cartesian coordinate system or polar coordinates in a polar coordinate system or direction specifications and kilometrage. The trajectory may be a distance in space or in a plane. If the trajectory is a three-dimensional trajectory, height changes may also be taken into account, for example for the adjustment of the height of the work equipment with respect to the terrain surface.

The controller may be a component of a central controller of the construction machine as well on which a control program (software) runs in order to actuate the individual components or assemblies of the construction machine. For example, the controller may contain a point lock control (PLC) which may comprise a microcontroller. The control and positioning mechanism may be a shared central control and computing unit.

In normal operation, the construction machine is controlled by a global navigation satellite system (GNSS) so that the reference point (R) on the construction machine moves along a set trajectory with a high level of accuracy. The control of the construction machine using the GNSS can comprise both control in the plane and also height control. The height may also be controlled, however, by using a terrestrial system (total station). Controlling the construction machine using the GNSS can also include evaluating correction signals received by a base station (differential GNSS). Controls of this kind are generally known in the art.

The construction machine provides a special control mode in which the construction machine is not controlled on the basis of the satellite signals from the global navigation satellite system (GNSS). As long as the navigation satellite system receiver receives the satellite signals with sufficient quality, the construction machine can be controlled using the GNSS alone. If the quality of the satellite signals that the satellite signal receiver receives is no longer adequate, the construction machine may be controlled in the special control mode.

The computing unit of the position-determining device of the construction machine according to the present invention is configured so that, in a control mode in which the control of the construction machine is not based on the satellite signals of the global navigation satellite system while the construction machine is moving, the position $(x_n, y_n, z_n)$ of the reference point (R) relating to the construction machine and the orientation ($\psi$) of the construction machine in the coordinate system (X, Y, Z) that is independent of the construction machine is determined on the basis of a kinematic model implemented in the computing unit of the position-determining device which describes the position (P) of the reference point (R) and the orientation ($\psi$) in the coordinate system (X, Y, Z) that is independent of the construction machine. On the basis of the kinematic model, the position (P) of the reference point (R) and the orientation ($\psi$) of the construction machine are calculated depending on the steering angles and the speeds of the running gears.

The position-determining device comprises steering angle sensors that are associated with the steerable running gears for determining the steering angle and speed sensors associated with the drivable running gears for determining the speeds of the running gears, wherein data transmission means are provided for transmitting the data describing the steering angles and the speeds from the steering angle sensors and the speed sensors to the computing unit as input variables of the kinematic model.

The current position of the reference point (R) and the current orientation ($\psi$) of the construction machine determined on the basis of the satellite signals of the global navigation satellite system may be continuously stored in a memory of the machine coordinate system (X, Y, Z) that is not dependent on the construction machine. If the control is to be based on the kinematic model, the last position (P) of the reference point (R) stored in the memory and the orientation ($\psi$) of the construction machine may, in the control mode that is based on the kinematic model, be retrieved from the memory as the current position (P) of the reference point (R) and the current orientation ($\psi$) of the construction machine. The new position and orientation can then be determined on the basis of the kinematic model from the current position and orientation.

A preferred embodiment of the construction machine provides that the computing unit of the position-determining device is configured so that, in the control mode based on the kinematic model, the position (P) of the reference point (R) and the orientation ($\psi$) of the construction machine are continuously determined at set time intervals. Consequently, in an iterative process, the new position and orientation determined on the basis of the kinematic model are, after a time interval has elapsed or after a certain distance has been travelled, used as input variables for the kinematic model for the subsequent time interval or the following distance so as to be able to determine a new position and orientation.

A particularly preferred embodiment of the construction machine provides that the computing unit of the position-determining device is configured so that the modelling of the movement of the construction machine takes place on the basis of a Lagrange approach. However, it is also possible to use other known mathematical methods and functions in order to be able to take into account any number of different secondary conditions.

The computing unit of the position-determining device is preferably configured so that the kinematic model takes into account empirically determined correction values for the steering angles and/or empirically determined correction values for the speed. A correction value may be an offset that has been previously determined and stored.

The controller of the construction machine according to the invention may be designed in various ways. In one embodiment, the controller is configured so that the drive mechanism is actuated in such a way that the distance between the target position described by the trajectory and the actual position of the reference point on the construction machine is minimal. The control may also be based on a directional difference described by the trajectory between a target direction and the actual direction of the construction machine.

A particular aspect of the invention is the compensation of factors that have an influence on the steering behaviour of a construction machine. These factors are summarised below under the term "slip". Preferred embodiments also consider slip in the control of the construction machine based on the kinematic model.

In a preferred embodiment of the construction machine, the computing unit of the position-determining device is configured so that, in the control mode in which the control of the construction machine is based on the satellite signals of the global navigation satellite system, at least one correction variable is determined for the kinematic model on the basis of at least one steering angle provided for a running gear by the controller in a specific route section. The computing unit of the position-determining device is then configured so that, in the control mode in which the control of the construction machine is not based on the satellite signals of the global navigation satellite system, the position $(x_n, y_n, z_n)$, of the reference point (R) relating to the construction machine and the orientation (ii) of the construction machine in the coordinate system (X, Y, Z) that is independent of the construction machine is determined on the basis of the kinematic model implemented in the computing unit of the position-determining device, which describes the position (P) of the reference point (R) and the orientation (ψ) in the coordinate system (X, Y, Z) that is independent of the construction machine in consideration of at least one correction variable.

The at least one correction variable for the steering angle is determined for the respective construction project while the machine operates in the terrain and depends on the actually existing conditions.

The known construction machines are characterised by work equipment provided on the machine frame. In a road milling machine, the work equipment is a milling drum/cutting roller equipped with milling/cutting tools; in a slipform paver, the work equipment is a device for moulding flowable material; and in a road paver, the work equipment is a paving screed for moulding material.

In the case of a construction machine, the correction variable may be, depending on the type of the work equipment and/or the arrangement of the work equipment in the direction of work, on the left or the right side of the longitudinal axis of the construction machine and/or the distance of the work equipment from the longitudinal axis of the machine frame (outreach) and/or the condition of the subsoil and/or the course of the route section to be worked on and/or the set feed rate of the construction machine or the speed of a running gear. The controller may provide for the correction of the steering angle of only one individual or all steerable running gears. Preferably, the steering angles of all running gears are corrected.

In a slipform paver, for example, the correction variable may, depending on the arrangement of the device used to form flowable material in the working direction, be determined from the left or right side of the longitudinal axis of the machine frame of the slipform paver and/or the distance of the device used to form flowable material to the longitudinal axis of the machine frame (outreach).

The route section for determining the at least one correction variable may basically be any route section, for example a straight route section or a curved route section. If the failure of the satellite signals only affects a relatively short period of time in which the construction machine only covers a relatively small distance, for example only 10 to 20 m, it can be assumed that the conditions on this route will change only insignificantly. For example, the slope or the direction of a roadway naturally does not change at all during such a short distance. A correction value determined for a current route section can therefore be regarded as representative for an immediately following route section.

In practice, it is sufficient if the at least one correction variable is determined in a straight route section. In this case, it is assumed that a construction project generally comprises a straight route section so that the correction variable may be determined in this route section. In this case, the correction variable for a running gear is the steering angle provided by the controller for the running gear in the straight section. The correction variable may then be determined in a particularly easy manner since it is basically made available to the construction machine by the controller.

Another embodiment provides for the determination of a plurality of correction variables for different circumstances or conditions. Consequently, different correction variables may be determined with each correction variable being assigned to a specific circumstance or condition. This correction variable may then be used for the same or comparable circumstances or conditions. The computing unit of the position-determining device is configured in this embodiment so that, in the control mode in which the control of the construction machine is based on the satellite signals of the global navigation satellite system, a plurality of correction variables is determined for the kinematic model depending on the course of the route section, that is, whether the route section is a straight or a curved route with a specific curvature, that is to say depending on the adjusted steering angle and/or depending on the speed of the running gear. Since these conditions on the construction site may change, it is preferable to determine the correction variable during the construction project so that it is available at all times.

In a slipform paver, one correction variable may be determined for an arrangement of the device used to mould flowable material in the working direction on the left side of the longitudinal axis of the slipform paver and one correction variable for an arrangement of the device used to form flowable material in the working direction on the right side of the longitudinal axis of the slipform paver. The correction variables may also be determined depending on the distance of the device used to form flowable material from the longitudinal axis of the machine frame (outreach).

If the construction machine is a road milling machine having a milling drum/cutting roller equipped with milling or cutting tools, correction variables for different arrangements or distances of the milling drum/cutting roller (outreach) can be determined. In a road finisher, correction variables for different arrangements or distances of the paving screed (outreach) for moulding material may be determined.

The correction variables for different arrangements or outreaches of the work equipment of a construction machine are correction variables which generally do not change during the construction project since the arrangement and outreach of the work equipment are specified for a construction project. Therefore, these correction variables may also be empirically determined on a test site in advance and stored in a memory.

The above correction variables may be stored in a memory. The computing unit of the position-determining device is then configured so that, in the control mode in which the control of the construction machine is not based on the satellite signals of the global navigation satellite system, the position ($x_n$, $y_n$, $z_n$) of the reference point (R) relating to the construction machine and the orientation (ψ) of the construction machine are determined in the coordinate system (X, Y, Z) that is independent of the construction machine on the basis of the kinematic model implemented in the computing unit of the position-determining device, which describes the position (P) of the reference point (R) and the orientation (ψ) in the coordinate system (X, Y, Z) that is independent of the construction machine in consideration of at least one of the plurality of correction variables. Consequently, the correction may be made with a correction variable representative of the particular circumstances or conditions of the construction project.

The embodiments described above assume that only one correction of the steering angle is required. Another particularly preferred embodiment provides for the determination of a correction variable for the kinematic model for a correction of the speeds of the running gears measured by the speed sensors as well. In this embodiment, the computing unit of the position-determining device is configured so that, in the control mode in which the control of the construction machine is based on the satellite signals of the global navigation satellite system, at least one correction variable is determined for the kinematic model on the basis of the difference between a speed provided for a running gear and the speed measured for the running gear. The computing unit of the position-determining device is then configured so that, in the control mode in which the control of the construction machine is not based on the satellite signals of the global navigation satellite system, the position ($x_n$, $y_n$, $z_n$) of the reference point (R) relating to the construction machine and the orientation ($\psi$) of the construction machine is determined in the coordinate system (X, Y, Z) that is independent of the construction machine on the basis of the kinematic model implemented in the computing unit (16) of the position-determining device, which describes the position (P) of the reference point (R) and the orientation ($\psi$) in the coordinate system (X, Y, Z) that is independent of the construction machine in consideration of at least one correction variable for the speed of the at least one running gear.

BRIEF DESCRIPTION OF THE SEVERAL VIEWS OF THE DRAWINGS

Below, an exemplary embodiment of the invention is described in detail with reference to the drawings.

In the drawings.

DETAILED DESCRIPTION

Figure 1A:
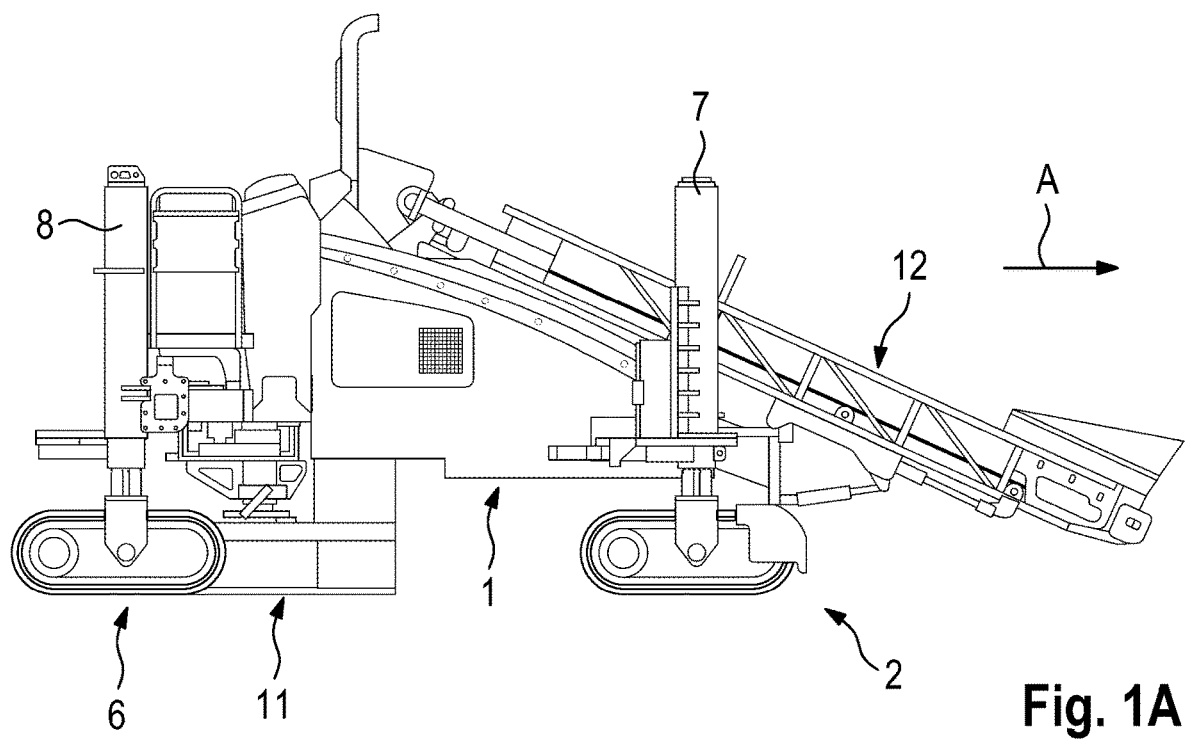
FIG. 1A shows a slipform paver from the side view.
Figure 2A:
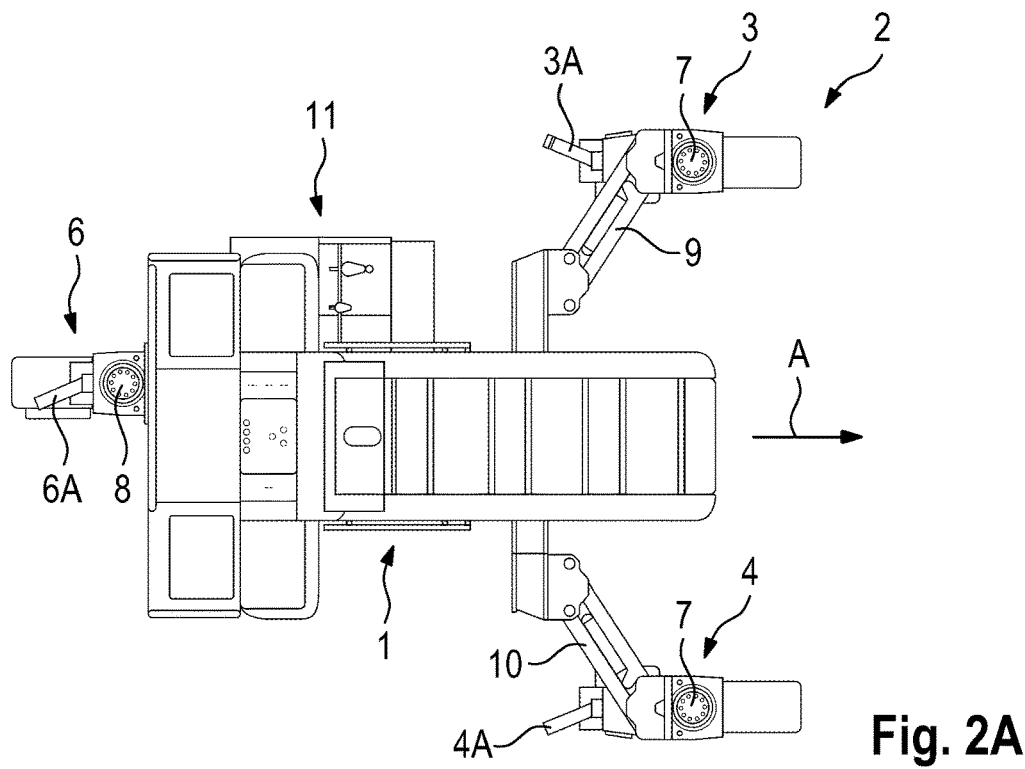
FIG. 2A shows the slipform paver of FIG. 1 from the top view without the conveyor while driving a straight line.

FIGS. 1A and 2A show as an example of a self-propelled construction machine a slipform paver with a conveyor from the side view (FIG. 1A) and the slipform paver from the plane view (FIG. 2A). A slipform paver is described in detail in EP 1 103 659 B1, for example. The designs are not limited to a slipform paver but generally refer to all construction machinery.

The slipform paver has a machine frame 1 which is supported by a chassis 2. In the working direction A, the chassis 2 has two front running gears 3, 4 and one rear running gear 6, which are attached to front and rear lifting columns 7, 8. The running gears 3, 4, and 6 may be crawler tracks or wheels. The lifting columns 7 of the front running gears 3, 4 may be attached to supports 9, 10 which are pivotally connected to the machine frame 1. The rear running gear 6 is movably guided transversely to the working direction A. In the left working direction A, an exchangeable slipform 11 is attached to the machine frame 1. A conveyor 12 is provided for the transport of material. Subsequently, it is assumed that the front left and right running gears 3, 4 and the rear running gear 6 are steerable running gears with at least the two front running gears 3, 4 having their own drive.

Figure 1B:
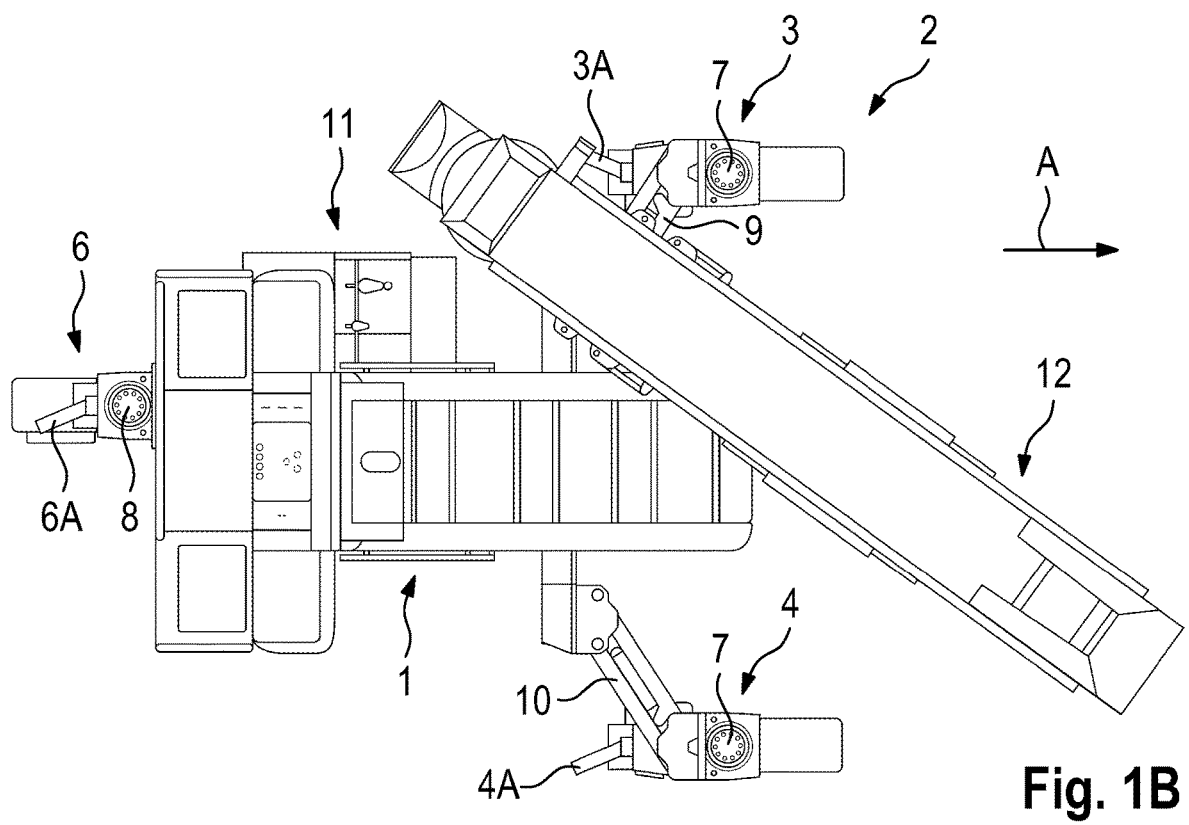
FIG. 1B shows the slipform paver of FIG. 1 from the top view.
Figure 2B:
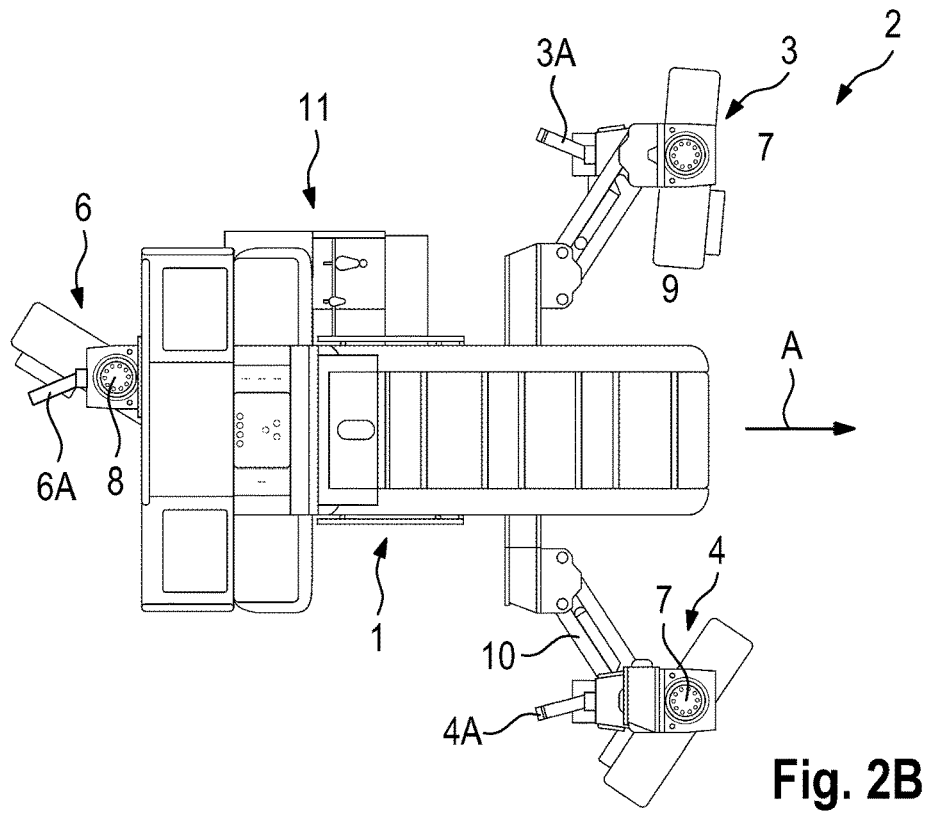
FIG. 2B shows the slipform paver of FIG. 1 in the top view without the conveyor during travel along a curve.

FIGS. 2A and 2B show the slipform paver of FIG. 1 in plane view, with the slipform paver shown in FIG. 2A in straight ahead travel and in FIG. 2B during travel along a curve without the conveyor. FIG. 2B shows the maximum steering angles of the two front running gears 3, 4 and the rear running gear 6. To adjust the steering angle, steering actuators 3A, 4A, 6A, which are only alluded to, and which may be piston/cylinder assemblies, are provided on the running gears 3, 4 and 6. The drive of the running gears may use hydraulic drive motors. Furthermore, it is assumed that the running gears are in contact with the ground at a specific contact point.

Figure 4:
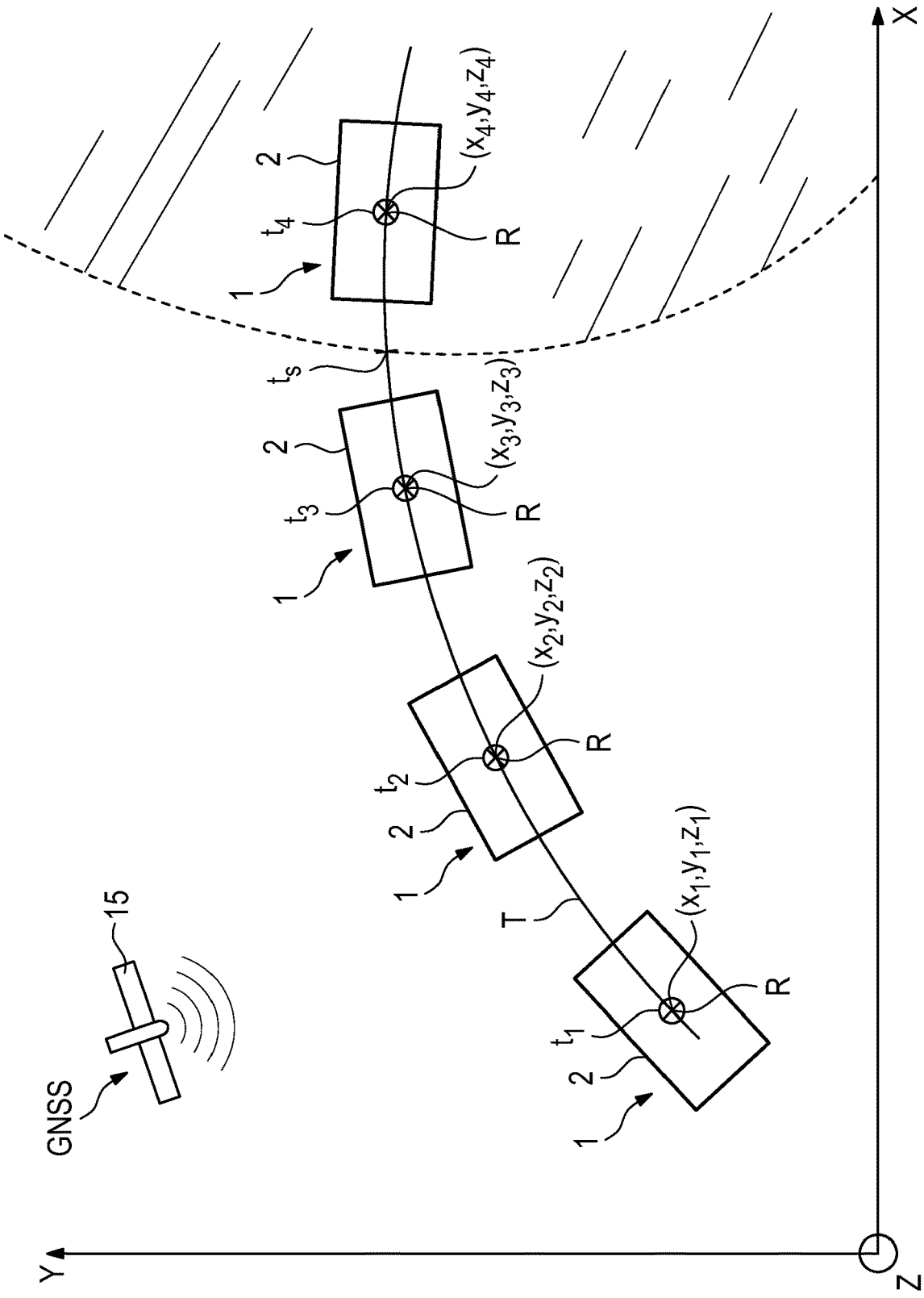
FIG. 4 shows the slipform paver together with a global navigation satellite system while driving.
Figure 5:
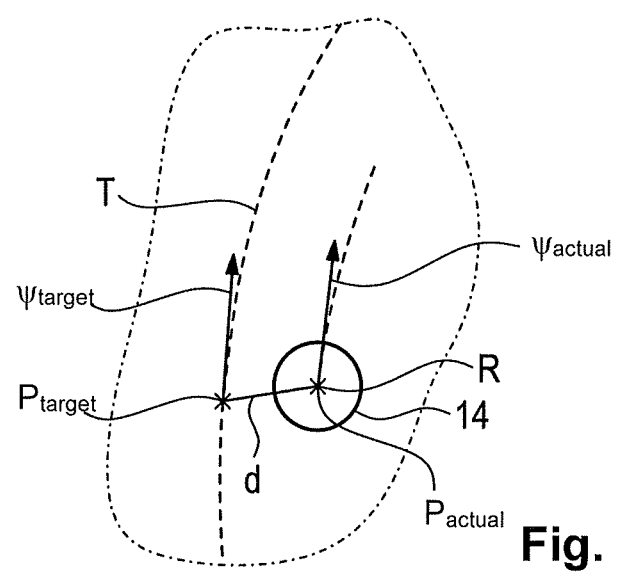
FIG. 5 shows a schematic representation that illustrates the control of the slipform paver.

When the slipform paver is operated, a largely automatic control without significant interventions by the driver is sought. The slipform paver therefore has an automatic control which uses a global navigation satellite system (GNSS) known from prior art. The steering angles of the running gears are set in such a way that a reference point R on the slipform paver or the slipform moves along a set trajectory (target travel path), i.e. on the trajectory T or at a set distance (equidistant) to the trajectory (FIGS. 4 and 5). Here, the trajectory T can be described by individual segments which may include straight lines or curves. The trajectory T is described by coordinates in a coordinate system (X, Y, Z) independent of the slipform paver which can be determined with a computer in an off-site office or on the machine. During the operation of the slipform paver, the actual position $P_{actual}$ of the slipform paver or the slipform and the desired position $P_{target}$ are permanently aligned so that the slipform moves along the trajectory T.

Figure 3:
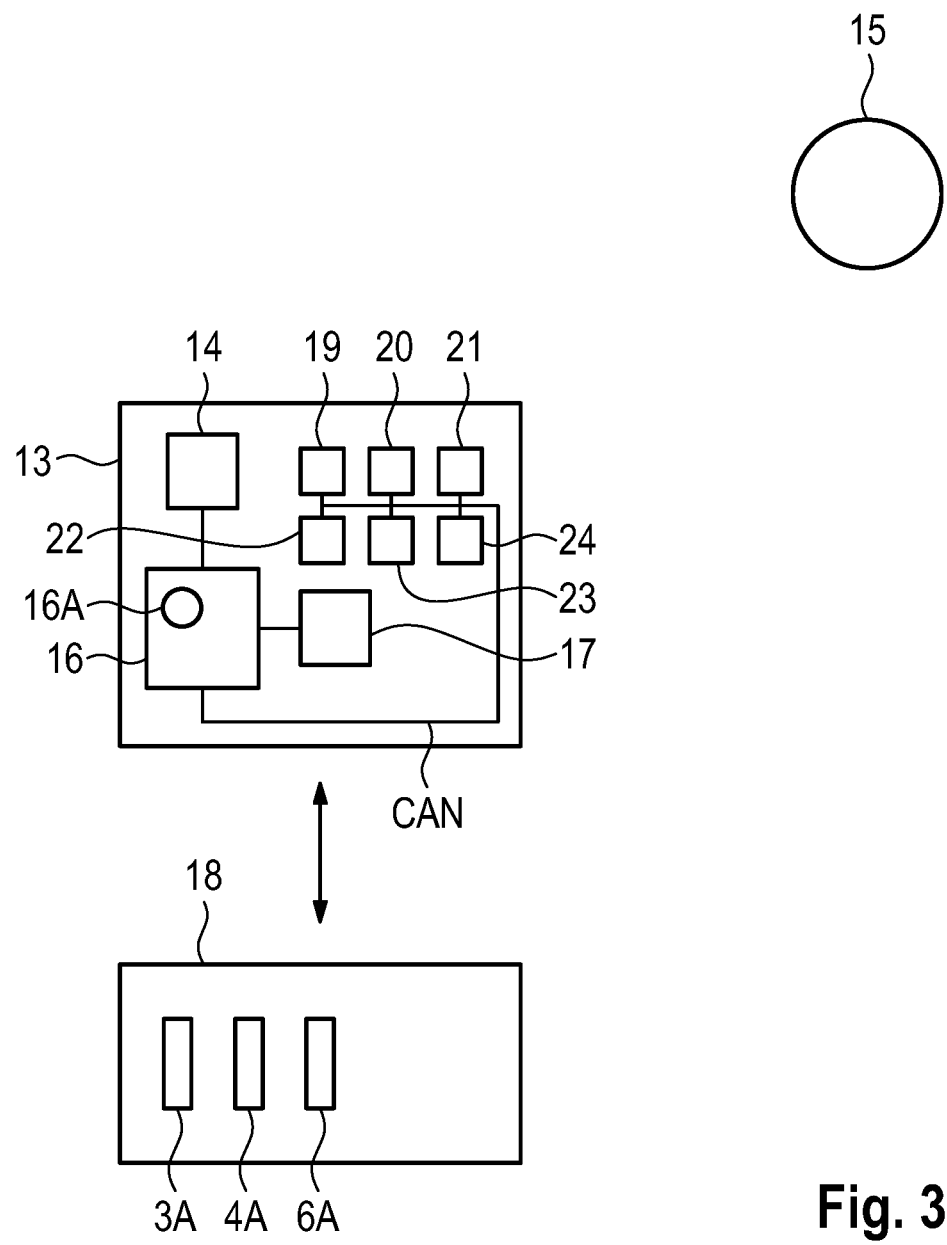
FIG. 3 shows a schematic representation of individual components of the slipform paver.

The construction machine has a position-determining device 13 for determining the position of a reference point R as it relates to the construction machine and the orientation ($\psi$) of the construction machine in a coordinate system independent of the construction machine (FIG. 3). The position-determining device 13 has at least one navigation satellite system receiver 14 for receiving satellite signals of a global navigation satellite system (GNNS) 15 and a computing unit 16 configured so that, based on the satellite signals of the global navigation satellite system 15, the position (P) of the reference point R and the orientation ($\psi$) of the construction machine in a coordinate system (X, Y, Z) that is independent of the construction machine are determined. The data describing the position and orientation ($\psi$) of the construction machine are continuously stored in a memory 17 of the position-determining device 13.

The computing unit 16 of the position-determining device 13 may be part of a central computing and control unit of the construction machine, which is not shown. The computing unit 16 may comprise, for example, general processors, digital signal processors (DSP) for continuously processing digital signals, microprocessors, application-specific integrated circuits (ASIC), integrated circuits consisting of logic elements (FPGA), or other integrated circuits (IC) or hardware components in order to carry out the processing operations described below. A data processing program (software) may run on the hardware components in order to carry out the method steps.

In addition, the construction machine has a controller 18 which collaborates with the position-determining device 13 and which is configured to adjust the steering angles of the steerable running gears 3, 4, 6 so that the reference point R of the construction machine moves along a set trajectory T. The controller 18 may also be part of a central computing and control unit of the construction machine, not shown, which may have the above-mentioned components.

FIG. 4 shows the movement of the construction machine 1 in a coordinate system (X, Y, Z) which is independent of the construction machine together with the GNSS. The construction machine moves along the trajectory T. For the sake of simplicity, it is assumed that the trajectory is a trajectory in the plane. In the present embodiment, it is assumed that the trajectory T shown in the drawing plane is a path described by a sequence of target positions (x, y, z) in the coordinate system (X, Y, Z).

During the movement of the construction machine 1, the position-determining device 13 determines the actual position (x, y, z) of a suitable reference point R on the construction machine in an ongoing manner. The actual position $P_{actual}$ of the construction machine is compared with the target position $P_{target}$ in an ongoing manner. The controller 18 controls the steering actuators 3A, 4A, 6A of the steerable running gears 3, 4, 6 so that the distance d between the target position $P_{target}$ described by the trajectory and the actual position $P_{actual}$ of the reference point R on the construction machine 1 is minimal (FIG. 5). This control requires knowledge of the actual position of the construction machine and thus the reception of the satellite signals of the GNSS.

The position-determining device 13 continually inspects the statistical quality of the position calculation on the basis of the given satellite constellation. If the statistical quality, for example in building coverings or under bridges, is not sufficient, the control can be based on a different control mode which is described in detail below.

FIG. 4 identifies the area in which the statistical quality of the satellite signals is no longer present through cross-hatching. When the construction machine is in this area, the controller 18 switches the control from a control mode based on the satellite signals to a control mode in which the control of the construction machine is no longer based on the satellite signals of the global navigation satellite system. The controller 18 is configured so that in this control mode during the movement of the construction machine the position ($x_n$, $y_n$, $z_n$) of the reference point R related to the construction machine and the orientation ($\psi$) in the coordinate system (X, Y, Z) that is independent of the construction machine is determined on the basis of a kinematic model 16A implemented in the computing unit 16 of the position-determining device 13 which describes the position (P) of the reference point R and the orientation ($\psi$) of the construction machine in the coordinate system (X, Y, Z) that is independent of the construction machine. The kinematic model 16A may be software that runs on the computing unit 16.

The position-determining device 13 has steering angle sensors 19, 20, 21 assigned to the front left and right running gears 3, 4 and the rear running gear 6 for determining the steering angles and speed sensors 22, 23, 24 for determining the speeds of the running gears 3, 4, 6, which are shown schematically in FIG. 3. The steering angle sensors 19, 20, 21 and speed sensors 22, 23, 24 should be extremely accurate. Magnetoresistive sensors, which determine the position of the piston of the piston/cylinder arrangements with which the steering angle can be adjusted, may be used as steering angle sensors 19, 20, 21, for example. Inductive proximity sensors, which are arranged in the transmissions by means of which the running gears 3, 4, 6 are driven, may be used as speed sensors 22, 23, 24, for example. Depending on the distance travelled, these sensors generate a specific number of pulses per distance unit or, depending on the speed of the running gears, a certain number of pulses per unit time. The data describing the steering angle and speeds of the steering angle sensors 19, 20, 21 and speed sensors 22, 23, 24 represent the input variables of the kinematic model 16A. Suitable data transmission means are provided for the transmission of these data. These data may be transmitted via a CAN bus, for example.

Another input variable of the kinematic model 16A is the position (P) of the reference point R and the orientation ($\psi$) of the construction machine determined based on the satellite signals of the global navigation satellite system 15 in the coordinate system (X, Y, Z) independent of the construction machine at the time at which the controller 18 switches from the control mode based on the satellite signals to the control mode based on the kinematic model. The data describing the position and orientation ($\psi$) of the construction machine have been previously stored in the memory 17 of the position-determining device 13. The controller 18 retrieves from the memory 17 the data describing the position (P) of the reference point R and the orientation ($\psi$) of the construction machine at the time the switch to the new control mode is made.

The output variables of the kinematic model 16A are the actual position $P_{actual}$ (x, y, z) of the reference point R on the construction machine and the orientation ($\psi$) of the construction machine in the coordinate system that is independent of the construction machine. The actual position $P_{actual}$ (x, y, z) of the reference point R on the construction machine is continuously compared with the target position $P_{target}$ in order to control the steering angles of the running gears 3, 4, 6 so that the reference point R moves along the trajectory T (FIG. 5).

The kinematic model is described in detail below.

The position (P) and orientation ($\psi$) of the construction machine will be provided below in a coordinate system that is a global coordinate system independent of the construction machine. The position and orientation ($\psi$) of the construction machine may be specified with respect to any reference point on the construction machine. In a slipform paver, for example, the reference point may be a point on the slipform, preferably a point on the longitudinal axis of the slipform.

If the position of a reference point on the construction machine and the orientation ($\psi$) of the construction machine in the global coordinate system are known, the position of any other reference point on the construction machine in this coordinate system may also be determined since the geometrical dimensions of the construction machine are known.

Figure 6:
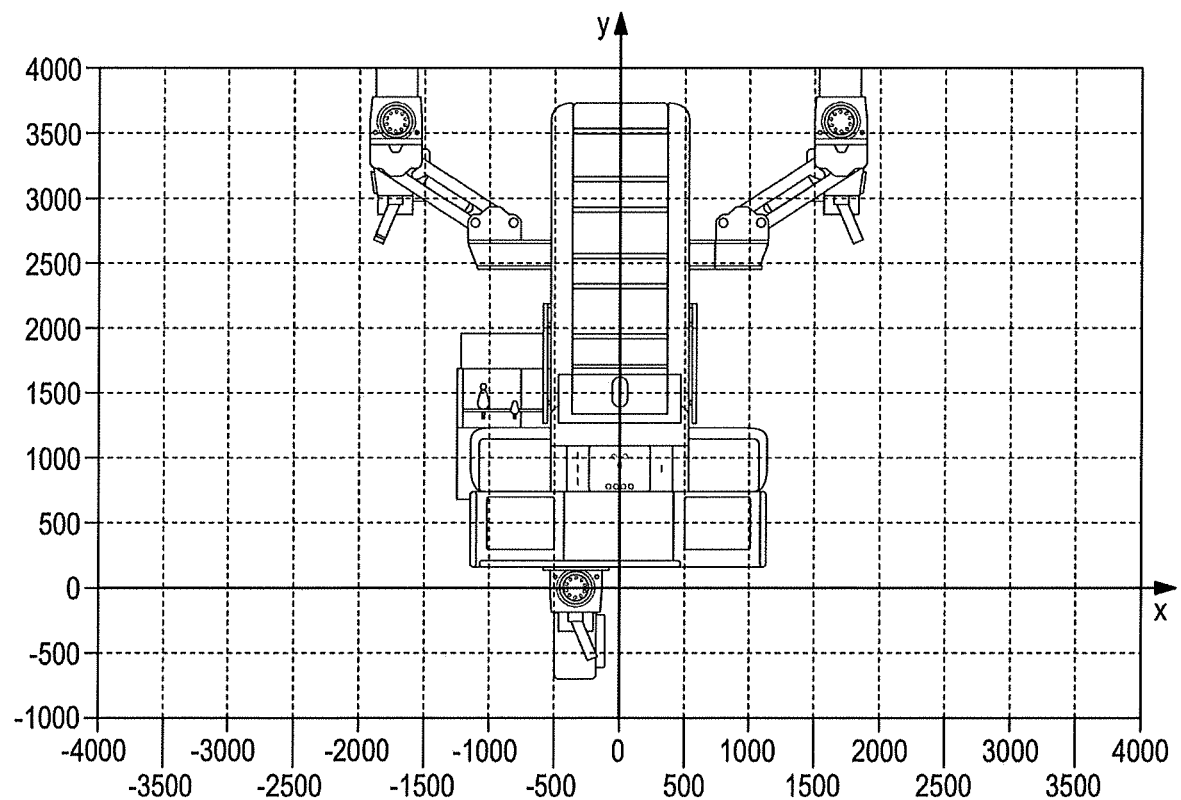
FIG. 6 shows the slipform paver in a machine coordinate system.

FIG. 6 shows the slipform paver in a machine coordinate system (X, Y) related to the slipform paver. For the kinematic model, the centre of gravity of the construction machine is assumed as the reference point, which is calculated according to the following equations:

$$x = \frac{X_{FL} \cdot m_{FL} + X_{FR} \cdot m_{FR}}{m_M} \qquad (2.3.2.1)$$

-continued
$$y = \frac{Y_{FL} \cdot m_{FL} + Y_{FR} \cdot m_{FR}}{m_M} \quad (2.3.2.2)$$

with $m_{FL}$ and $m_{FR}$ being the weights measured at the front running gears 3, 4, $m_M$ being the total weight of the slipform paver, and $X_{FL}$ being the distance of the front left running gear 3, and $X_{FR}$ being the distance of the front right running gear 4 from the origin of the machine coordinate system.

Figure 7:
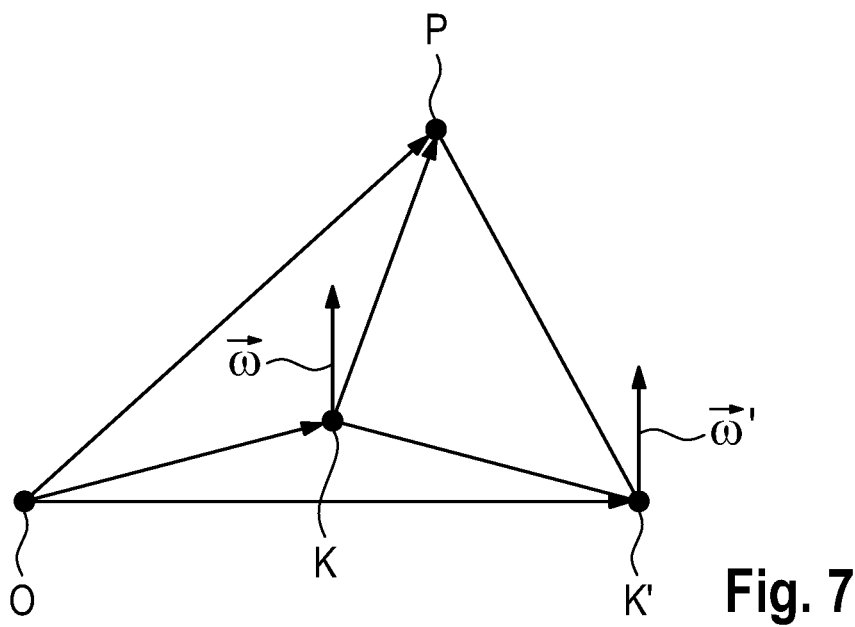
FIG. 7 shows a schematic representation illustrating the motion of a rigid body.

It is assumed that the construction machine is a rigid body. The speed of a rigid body can be calculated at any point according to the following equation:

$$\overline{V}_P = \overline{V}_K + \overline{\omega} \times \overline{KP}(t) \quad (4.1.1)$$

with $V_P$ being the speed vector of any point of the rigid body to be determined, $V_K$ the speed vector of a point of the rigid body at which the speed vector is known, $\omega$ being the angular speed, and KP (t) the distance vector between these two points (FIG. 7).

For the construction machine, the following speed vectors are at the centre of gravity:

$$\overline{V}_{CG} = \overline{V}_{FL} + \overline{\omega} \times \overline{d}_{FL\text{-}CG} \quad (4.1.2)$$

$$\overline{V}_{CG} = \overline{V}_{FR} + \overline{\omega} \times \overline{d}_{FR\text{-}CG} \quad (4.1.3)$$

$$\overline{V}_{CG} = \overline{V}_R + \overline{\omega} \times \overline{d}_{R\text{-}CG} \quad (4.1.4)$$

with $V_{FL}$ being the speed vector of the point of contact of the front left running gear 3, $V_{FR}$ the speed vector of the point of contact of the front right running gear 4, and $V_R$ the speed vector of the point of contact of the rear running gear 6, $V_{CG}$ the speed vector of the construction machine at the centre of gravity of the construction machine, $d_{FL\text{-}CG}$ the distance vector between the point of contract of the front left running gear 3 and the centre of gravity, $d_{FR\text{-}CG}$ the distance vector between the point of contact of the front right running gear 4 and the centre of gravity, and $d_{R\text{-}CG}$ the distance vector between the point of contact of the rear running gear 6 and the centre of gravity.

Subsequently, the above vectors are transformed into the global coordinate system to describe the movement of the construction machine in a coordinate system that is independent of the construction machine. The angles $\eta$ and $\mu$ are introduced for this purpose. The position and orientation (w) of the construction machine in a UTM coordinate system are described below. However, the position and orientation (w) of the construction machine may also be described in other global coordinate systems, for example in a Gauss-Krüger coordinate system or an MGRS system.

Figure 8:
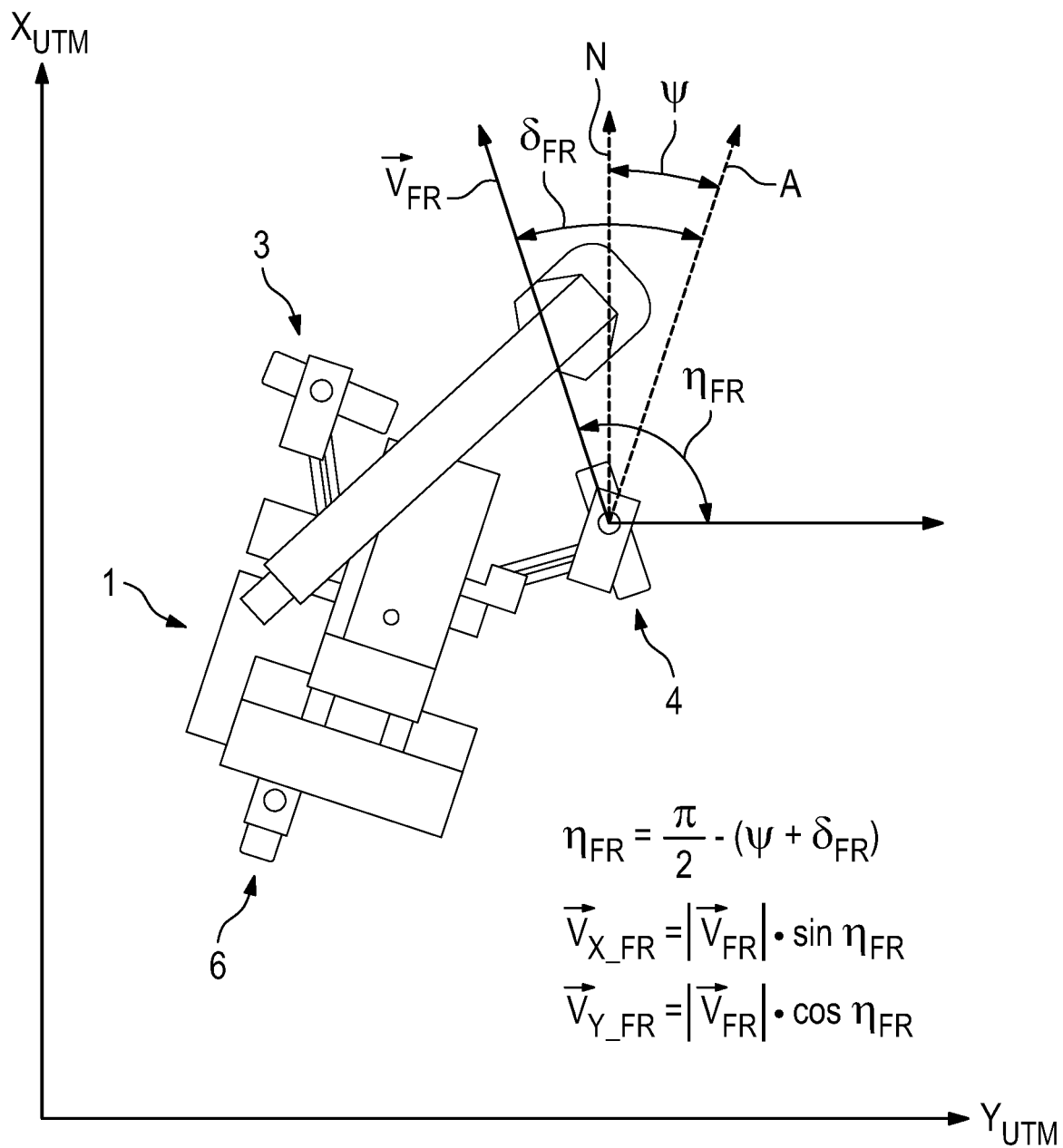
FIG. 8 shows the slipform in a UTM coordinate system to illustrate the determination of the angle $\eta$.

FIG. 8 shows the construction machine in the UTM coordinate system with the construction machine making a left turn. In FIG. 8, the working direction A of the construction machine, the speed vector $V_{FR}$ of the points of contact of the front right running gear 4, the steering angle $\delta$ of the front right running gear 4, and the angle $\psi$ are shown in the UTM coordinate system. In FIG. 8, $\psi$ is the angle between the working direction A and the north-south direction ("northing") N ("false northing").

The angle $\eta$ is calculated according to the following equation:

$$\eta_{FR} = \frac{\pi}{2} - (\psi + \delta_{FR})$$

The angle $\eta$ can be used to decompose the speed vector $V_{FR}$ of the front right running gear 4 with respect to the Y-axis and X-axis of the coordinate system into the vectors $V_{Y\_FR}$ and $V_{X\_FR}$ which are calculated according to the following equations:

$$\overline{V}_{X\_FR} = |\overline{V}_{FR}| \cdot \sin \eta_{FR}$$

$$\overline{V}_{Y\_FR} = |\overline{V}_{FR}| \cdot \cos \eta_{FR}$$

Figure 9:
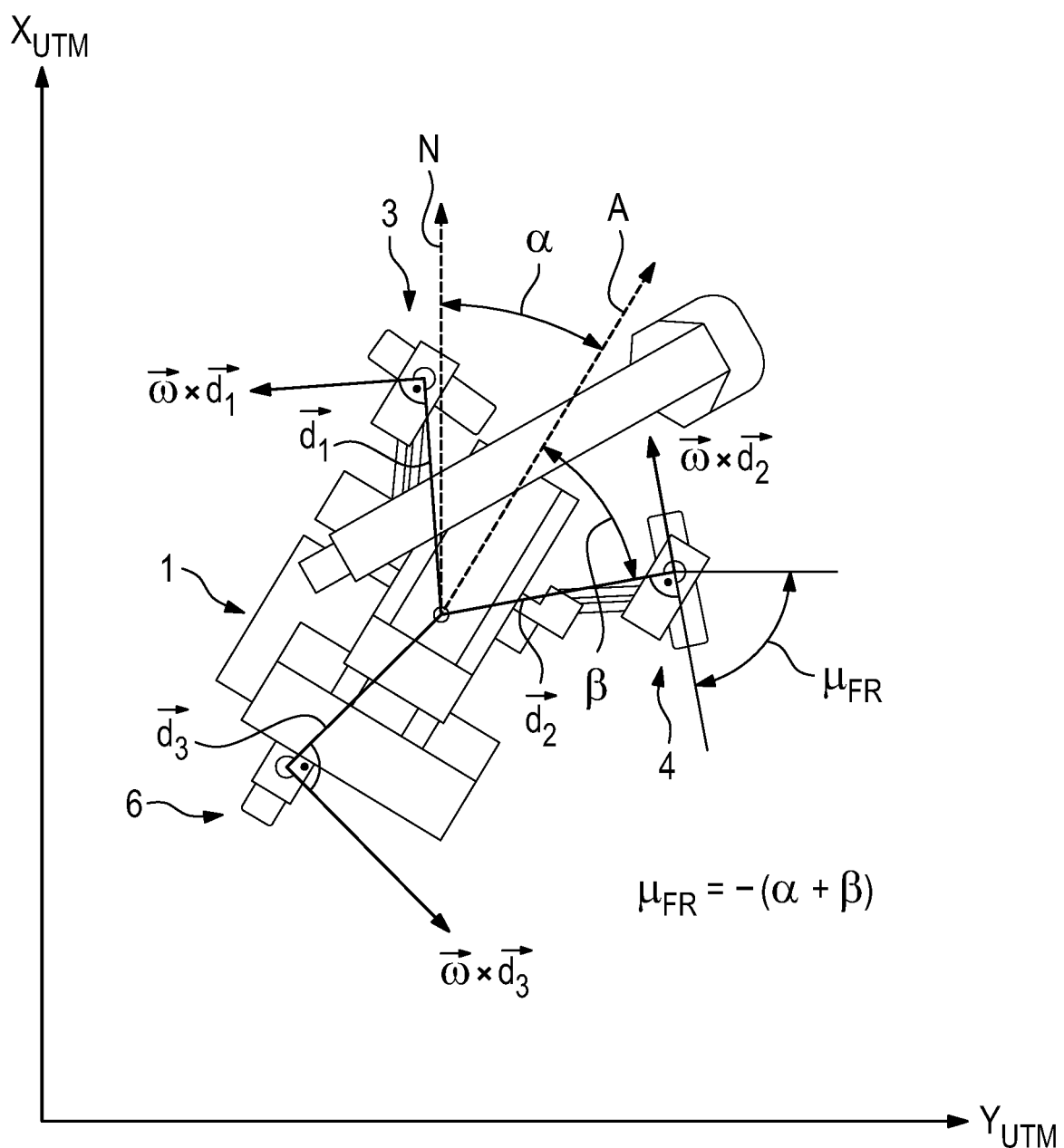
FIG. 9 shows the slipform paver in a UTM coordinate system to illustrate the determination of the angle $\mu$.

In order to be able to decompose the vectors $\omega \times d_1$, $\omega \times d_2$, and $\omega \times d_3$ with respect to the X-axis and Y-axis of the UTM coordinate system, the angles $\alpha$ and $\delta$ are calculated, the angle $\alpha$ describing the orientation ($\psi$) of the construction machine in the UTM coordinate system and the angle $\beta$ the orientation ($\psi$) of the distance vector $d_2$ in the machine coordinate system. The distance vector $d_2$ is calculated from the known geometric dimensions of the construction machine. FIG. 9 shows the vectors $\omega \times d_1$, $\omega \times d_2$, $\omega \times d_3$ and the angles $\alpha$ and $\beta$. The angle $\mu_{FR}$ is calculated according to the following equation:

$$\mu_{FR} = -(\alpha + \beta)$$

With the help of the above angles, the equations (4.1.2), (4.1.3), (4.1.4) can be transformed as follows:

$$V_{Y_{UTM}} = |\overline{V}_{FL}| \cdot \cos \eta_{FL} + |\overline{\omega}| \cdot d_1 \cdot \cos \mu_{FL}$$

$$V_{X_{UTM}} = |\overline{V}_{FL}| \cdot \sin \eta_{FL} + |\overline{\omega}| \cdot d_1 \cdot \sin \mu_{FL}$$

$$V_{Y_{UTM}} = |\overline{V}_{FR}| \cdot \cos \eta_{FR} + |\overline{\omega}| \cdot d_2 \cdot \cos \mu_{FR}$$

$$V_{X_{UTM}} = |\overline{V}_{FR}| \cdot \sin \eta_{FR} + |\overline{\omega}| \cdot d_2 \cdot \sin \mu_{FR}$$

$$V_{Y_{UTM}} = |\overline{V}_R| \cdot \cos \eta_R + |\overline{\omega}| \cdot d_3 \cdot \cos \mu_R$$

$$V_{X_{UTM}} = |\overline{V}_R| \cdot \sin \eta_R + |\overline{\omega}| \cdot d_3 \cdot \sin \mu_R \quad (4.1.5)$$

with $V_{Y\_UTM}$ being the speed of the centre of gravity of the construction machine in the direction of the Y-axis and $V_{Y\_UTM}$ being the speed of the centre of gravity of the construction machine in the direction of the X-axis in the UTM coordinate system and $V_{FL}$, $V_{FR}$, and $V_R$ the speeds of the front left running gear 3, front right running gear 4, and rear running gear 6 measured with the speed sensors 22, 23, 24.

The equations (4.1.5) can be rewritten as follows:

$$|\overline{V}_{FL}| \cdot \cos \eta_{FL} = V_{Y_{UTM}} - |\overline{\omega}| \cdot d_1 \cdot \cos \mu_{FL}$$

$$|\overline{V}_{FL}| \cdot \sin \eta_{FL} = V_{X_{UTM}} - |\overline{\omega}| \cdot d_1 \cdot \sin \mu_{FL}$$

$$|\overline{V}_{FR}| \cdot \cos \eta_{FR} = V_{Y_{UTM}} - |\overline{\omega}| \cdot d_2 \cdot \cos \mu_{FR}$$

$$|\overline{V}_{FR}| \cdot \sin \eta_{FR} = V_{X_{UTM}} - |\overline{\omega}| \cdot d_2 \cdot \sin \mu_{FR}$$

$$|\overline{V}_R| \cdot \cos \eta_R = V_{Y_{UTM}} - |\overline{\omega}| \cdot d_3 \cdot \cos \mu_R$$

$$|\overline{V}_R| \cdot \sin \eta_R = V_{X_{UTM}} - |\overline{\omega}| \cdot d_3 \cdot \sin \mu_R \quad (4.1.6)$$

In order to be able to map the movement of the construction machine with greater accuracy by means of the kinematic model 16A taking into account the real-time conditions, the Lagrange approach is used below with the secondary conditions being defined by assigning functions to given values. This method introduces a new unknown scalar variable for each secondary condition, a Lagrange multiplier, and defines a linear combination that integrates the multipliers as coefficients (WIKIPEDIA: Lagrange multiplier).

The Lagrange approach yields the following equation system:

$$V_{FL} \cdot \cos \eta_{FL} = V_{Y_{UTM}} - \omega \cdot d_1 \cdot \cos \mu_{FL} + e_1$$

$$V_{FL} \cdot \sin \eta_{FL} = V_{X_{UTM}} - \omega \cdot d_1 \cdot \sin \mu_{FL} + e_2$$

$$V_{FR} \cdot \cos \eta_{FR} = V_{Y_{UTM}} - \omega \cdot d_2 \cdot \cos \mu_{FR} + e_3$$

$$V_{FR} \cdot \sin \eta_{FR} = V_{X_{UTM}} - \omega \cdot d_2 \cdot \sin \mu_{FR} + e_4$$

$$V_R \cdot \cos \eta_R = V_{Y_{UTM}} - \omega \cdot d_3 \cdot \cos \mu_R + e_5$$

$$V_R \cdot \sin \eta_R = V_{X_{UTM}} - \omega \cdot d_3 \cdot \cos \mu_R + e_6 \quad (4.2.1)$$

The equation system (4.2.1) can be rewritten as follows:

$$\begin{bmatrix} V_{FL} \cdot \cos \eta_{FL} \\ V_{FL} \cdot \sin \eta_{FL} \\ V_{FR} \cdot \cos \eta_{FR} \\ V_{FR} \cdot \sin \eta_{FR} \\ V_R \cdot \cos \eta_H \\ V_R \cdot \sin \eta_H \end{bmatrix} = \begin{bmatrix} 1 & 0 & -d_1 \cdot \cos \mu_{FL} \\ 0 & 1 & -d_1 \cdot \sin \mu_{FL} \\ 1 & 0 & -d_2 \cdot \cos \mu_{FR} \\ 0 & 1 & -d_2 \cdot \sin \mu_{FR} \\ 1 & 0 & -d_3 \cdot \cos \mu_R \\ 0 & 1 & -d_3 \cdot \sin \mu_R \end{bmatrix} \cdot \begin{bmatrix} V_{Y_{UTM}} \\ V_{X_{UTM}} \\ \omega \end{bmatrix} + \begin{bmatrix} e_1 \\ e_2 \\ e_3 \\ e_4 \\ e_5 \\ e_6 \end{bmatrix} \quad (4.2.8)$$

$$y = Ax + e \quad (4.2.9)$$

The calculation algorithm implemented in the computing unit 16 of the position-determining device 13 provides a continuous calculation (i=1, 2, 3 ... n) of the speed at the centre of gravity of the construction machine in the direction of the Y-axis ($V_{Y\_UTM}$) and the X-axis ($V_{X\_UTM}$) of the UTM coordinate system and the angular speed co according to the equation system (4.2.8) at successive points in time ($t_1, t_2, t_3, \ldots t_n$). The steering angles and the speeds of the running gears 3, 4, 6 are continuously measured by the steering angle sensors 19, 20, 21 and the speed sensors 22, 23, 24. The time interval between two consecutive measurements is $\Delta t$. The steering angle and speed are measured 10 times per second, for example ($\Delta t = 0.1$ s). The computing unit 16 receives the measured values (data) of the steering angle and speed sensors 19, 20, 21, 22, 23, 24 and calculates the speed $V_{Y\_UTM}$ and $V_{X\_UTM}$ and the angular speed co at the successive points in time ($t_1, t_2, t_3, \ldots t_n$). After the end of each time interval $\Delta t$, the position and orientation ($\psi$) of the construction machine for the subsequent point in time is calculated from the position and orientation ($\psi$) calculated at the previous point in time according to the following equations.

$$Y_{UTM}(i) = Y_{UTM}(i-1) + V_Y \cdot \Delta t \quad (4.2.10)$$

$$X_{UTM}(i) = X_{UTM}(i-1) + V_X \cdot \Delta t \quad (4.2.11)$$

$$\psi(i) = \psi(i-1) + \omega \cdot \Delta t \quad (4.2.12)$$

with $\psi$ being the orientation ($\psi$) of the construction machine in the UTM coordinate system, $\Delta t$ the time interval between two successive measurements, and i being the number of the measurement.

At the time ts, when the control mode in which the control is not based on the satellite signals is switched over, the position and orientation ($\psi$) of the construction machine in the UTM coordinate system are known because the position and orientation ($\psi$) of the construction machine have previously been determined and stored on the basis of the satellite signals of the global navigation satellite system 15. The previously determined position and orientation ($\psi$) of the construction machine is retrieved from the memory 17 by the computing unit 16 of the position-determining device 13 at the point in time ts so that the new position and orientation ($\psi$) can be calculated. The continuously recalculated position and orientation ($\psi$) are stored in the memory 17 and retrieved from the memory for the subsequent calculations.

During the control mode in which the position and orientation ($\psi$) of the construction machine are not determined by means of the global navigation satellite system 15 but are calculated on the basis of the kinematic model 16A, the controller 18 sets the steering angles of the running gears 3, 4, 6 so that the distance (d) between the desired position ($P_{target}$) described by the trajectory and the actual position ($P_{actual}$) of the reference point R determined by the position-determining device 13 on the basis of the kinematic model 16A is minimal (FIG. 5). Consequently, the control of the construction machine can also be done when the satellite signals are not received. When the satellite signals are received again, a switch back to the control mode that uses the global navigation satellite system 15 can be made again. The switch can be done automatically when the statistical quality of the position calculation has returned. For this purpose, the position-determining device 13 continuously determines the quality of the signals. At the time the switch to the control mode using the global navigation satellite system 15 is made, the deviation of the calculated position from the position determined by the navigation satellite system can be determined. After the switchover, the position and orientation ($\psi$) determined with the navigation satellite system are again continuously stored in the memory 17 in order to be available for a possible failure of the satellite-based control.

The kinematic model described above presupposes physically ideal conditions; that is to say that the steering angles or speeds determined by means of the steering angle sensors 19, 20, 21 and the speed sensors 22, 23, 24 correspond to the actual directional changes or actual ground movements that were made. In practice, however, this is not the case. In practice, there is a difference between the theoretical movement that can be calculated by the kinematic model and the movement actually occurring under the actual conditions. This effect or difference is also called slip.

Tests with a slipform paver whose slipform is not filled with concrete have shown that corrections of the steering angle are required when the vehicle moves in a straight line. It has been shown that these corrections are due to slip. Furthermore, it has been shown that the corrections necessary for compensation are relatively small.

To model the movement of the construction machine, it is assumed that the sum of the corrections of the left angle is zero in the left or right direction relating to the working direction A over the entire distance of the movement in a straight line.

$$s = \frac{\sum_{i=1}^{n} \varphi(i)}{n}. \quad (4.3.1)$$

with n being the number of measurements of the steering angle φ of the respective running gear.

In the embodiment of the slipform paver, it has been shown in tests with unfilled concrete trough that a correction of the steering angle of the front running gears 3, 4 is required but that a correction of the steering angle of the rear running gear 6 is negligible. In tests, a correction value of −0.81 (offset [°]) was determined for the steering angle co of the front left running gear 3, a correction value of −0.71 (offset [°]) for the steering angle co of the front right running gear 4, and a correction value of 0.005 (offset [°]) for the steering angle co of the rear running gear 6.

For the correction of the measured steering angle, the offset value of the respective front running gear is empirically determined from the corresponding angle n.

This results in the following equation system:

$$V_{FL} \cdot \cos(\eta_{FL} - s_{FL}) = V_{Y_{UTM}} - \omega \cdot d_1 \cdot \cos \mu_{FL} + e_1$$

$$V_{FL} \cdot \sin(\eta_{FL} - s_{FL}) = V_{X_{UTM}} - \omega \cdot d_1 \cdot \sin \mu_{FL} + e_2$$

$$V_{FR} \cdot \cos(\eta_{FR} - s_{FR}) = V_{Y_{UTM}} - \omega \cdot d_2 \cdot \cos \mu_{FR} + e_3$$

$$V_{FR} \cdot \sin(\eta_{FR} - s_{FR}) = V_{X_{UTM}} - \omega \cdot d_2 \cdot \cos \mu_{FR} + e_4$$

$$V_R \cdot \cos \eta_R = V_{Y_{UTM}} - \omega \cdot d_3 \cdot \cos \mu_R + e_5$$

$$V_R \cdot \sin \eta_R = V_{X_{UTM}} - \omega \cdot d_3 \cdot \cos \mu_R + e_6 \quad (4.3.2)$$

with $s_{FL}$ being the offset value of the front left running gear 3 and $s_{FR}$ the offset value of the front right running gear 4.

In addition, it has been shown in tests with slipform pavers that, due to the slip, the speed of the running gears is subject to fluctuations. Therefore, an average speed is calculated from the speeds measured with the corresponding speed sensor 22, 23, 24 for each running gear 3, 4, 6 in a certain representative time interval and, as the offset value for the speed sensor, the difference between the set target speed and the average speed. In tests performed on the present slipform paver, deviations from the target speed of 0.11 cm/s were found for the left front running gear 3, deviations from the target speed of 0.10 cm/s for the front right running gear, and deviations from the target speed of the rear running gear 6 of 0.16 cm/s. It has been shown that the speed measured for all drives is less than the actual speed.

This results in the following equation system:

$$(V_{FL} + v_{FL}) \cdot \cos(\eta_{FL} - s_{FL}) = V_{Y_{UTM}} - \omega \cdot d_1 \cdot \cos \mu_{FL} + e_1$$

$$(V_{FL} + v_{FL}) \cdot \sin(\eta_{FL} - s_{FL}) = V_{X_{UTM}} - \omega \cdot d_1 \cdot \sin \mu_{FL} + e_2$$

$$(V_{FR} + v_{FR}) \cdot \cos(\eta_{FR} - s_{FR}) = V_{Y_{UTM}} - \omega \cdot d_2 \cdot \cos \mu_{FR} + e_3$$

$$(V_{FR} + v_{FR}) \cdot \sin(\eta_{FR} - s_{FR}) = V_{X_{UTM}} - \omega \cdot d_2 \cdot \cos \mu_{FR} + e_4$$

$$(V_R + v_R) \cdot \cos \eta_R = V_{Y_{UTM}} - \omega \cdot d_3 \cdot \cos \mu_R + e_5$$

$$(V_R + v_R) \cdot \sin \eta_R = V_{X_{UTM}} - \omega \cdot d_3 \cdot \cos \mu_R + e_5 \quad (4.4.1)$$

with $v_{FL}$ being the offset value of the front left running gear 3, $v_{FR}$ being the offset value of the front right running gear 4, and $v_R$ being the offset value of the rear running gear 6.

With the above-described corrections, the accuracy of the movement of the construction machine can be improved. The determination of steering angles and speeds and their corrections are not limited to the running gears described with respect to the slipform paver as an example of a construction machine. For example, if four running gears are drivable and/or steerable running gears, the steering angles and speeds even of four running gears may be taken into account. However, it is also possible to use the steering angles and speeds of only two running gears as input variables for the kinematic model.

The tests described above show the behaviour of a slipform paver when its concrete trough is not filled with concrete. During the operation of a slipform paver, however, the concrete trough is filled with concrete, which has a relatively high weight. In practice, it has been found that the relatively high weight of the concrete trough filled with concrete and the interaction of the concrete with the ground surface may influence the movement of the construction machine in the terrain. The same effects may occur in a road milling machine because of an off-centre arrangement of the milling drum/cutting roller or a paver because of an off-centre arrangement of the paving screed. This aspect of the invention, which is of particular inventive significance, will be described below.

Figure 10A:
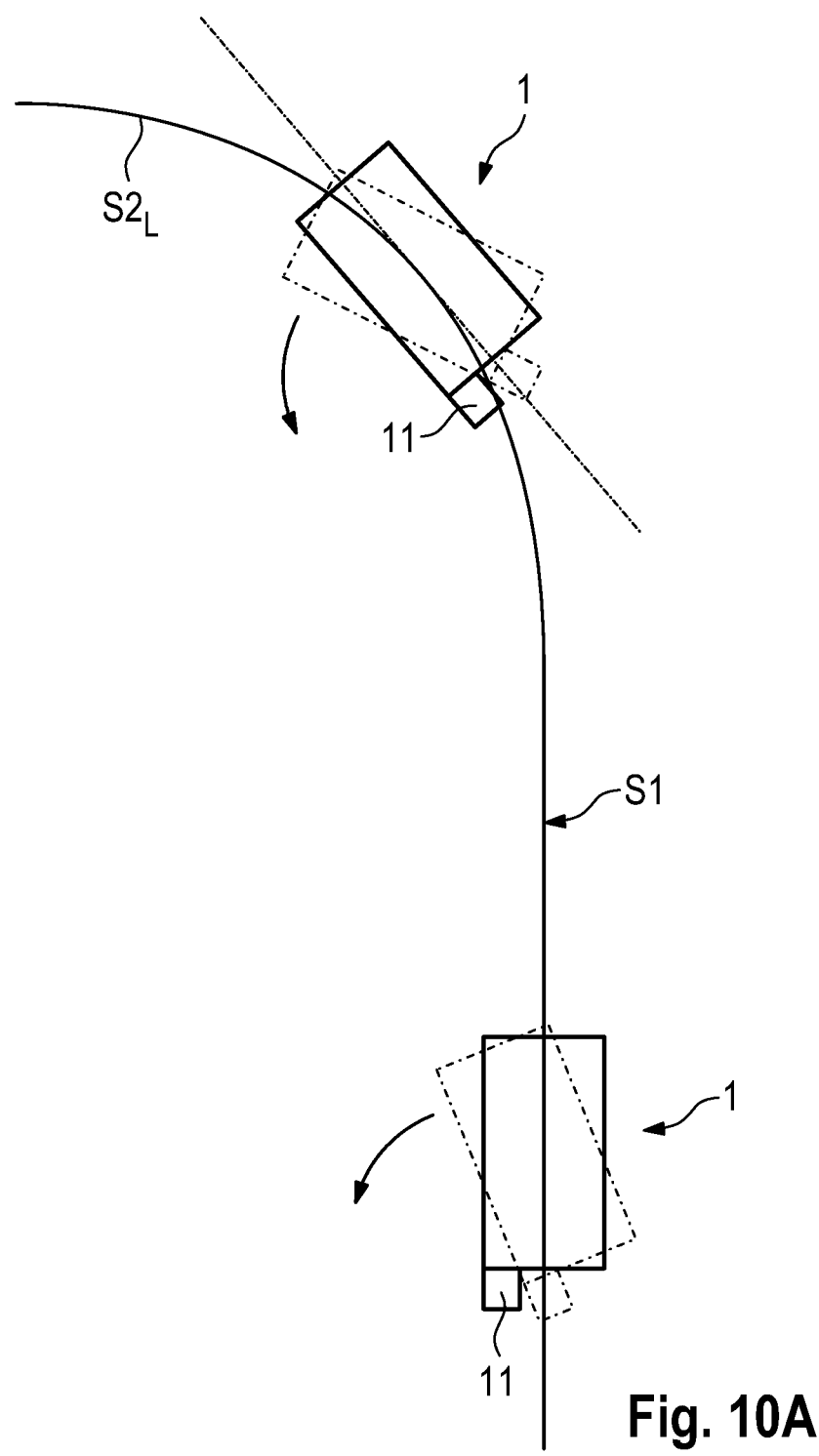
FIG. 10A shows a highly simplified schematic representation of a slipform paver while transitioning from a straight route section to a left turn.
Figure 10B:
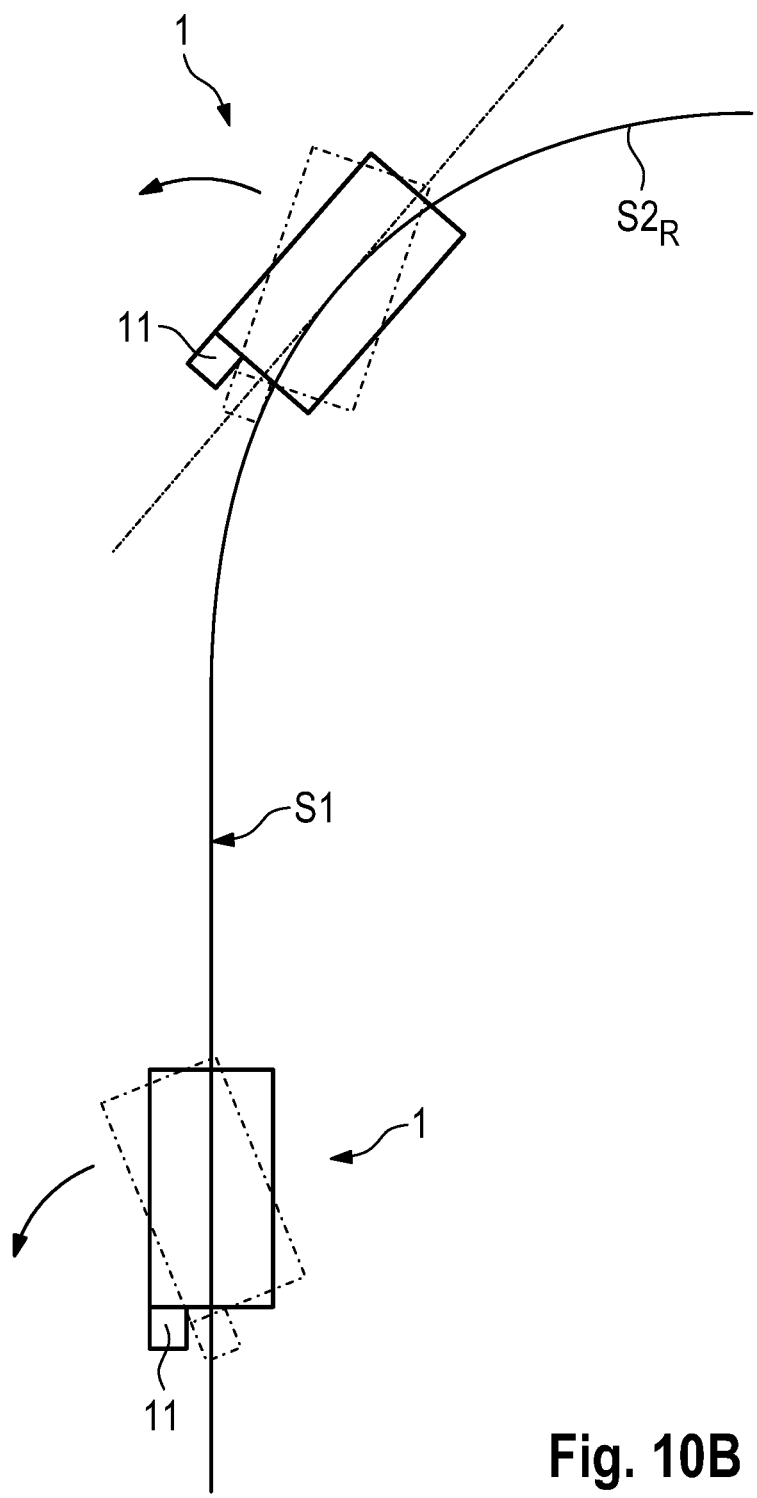
FIG. 10B shows a highly simplified schematic representation of a slipform paver while transitioning from a straight route section to a right turn.

FIG. 10A shows in a highly simplified representation of a self-propelled construction machine which is to initially move on a straight line S1 and then take a left turn S2L while FIG. 10B shows a construction machine which is to initially move on a straight line S1 and then take a right turn S2$_R$. In the present exemplary embodiment, the trajectory on which the control of the construction machine is based therefore has a straight route section followed by a curved route section. In the present embodiment, the curved route section is a quarter circle.

The construction machine can be, for example, a slipform paver or a road milling machine or a road paver. For example, if the concrete trough of a slipform paver is not disposed on the longitudinal axis of the machine frame, but is offset laterally to the longitudinal axis of the machine frame, which is the case in practice, the concrete trough exerts during the movement of the slipform paver a torque about its vertical axis which causes the slipform paver to make a turn even though the running gears have a steering angle of 0°. Accordingly, a milling drum of a road milling machine arranged laterally with respect to the longitudinal axis of the machine frame exerts a torque so that the road milling machine makes a turn even though the steering angle is 0°.

FIGS. 10A and 10B show in a highly simplified schematic representation a construction machine, in particular a slipform paver or a road milling machine or a paver, with the off-centre arranged concrete trough or milling drum or paving screed being denoted by the reference sign "11". When the concrete trough or the milling drum or the paving screed 11 are arranged in the working direction on the left side of the longitudinal axis of the machine frame 1, torque is applied to the machine frame 1 which slightly turns the machine frame to the left. Thus, a slipform paver with a concrete trough or a road milling machine with a milling drum 11 arranged on the left side makes a slight left-hand turn when the running gears are set to go straight. A slipform paver or a road milling machine with a concrete trough or milling drum 11 arranged on the right side, on the other hand, drives a slight right-hand turn when the running gears are set to go straight.

When the concrete trough 11 is located on the left side, the turning radius that is actually driven is reduced in running gears deflected to the left (FIG. 10A), while in running gears deflected to the right (FIG. 10B), the turning radius that is actually driven is increased. If the concrete trough or milling drum 11 is arranged on the right side, the turning radius that is actually driven increases when the running gears are deflected to the left (FIG. 10A), while the actually driven turning radius decreases when the running gears are deflected to the right (FIG. 10B).

The factors influencing the movement of the construction machine described above are summarised below in further detail under the term slip introduced above.

In the automatic control of the construction machine based on the satellite signals of the global navigation satellite system, the slip does not matter insofar as the steering angles and the speeds of the running gears are continuously adjusted so that the construction machine follows the trajectory. Without this control, however, the driver would have to "counter-steer" accordingly to keep the construction machine in the desired lane.

A particular aspect of the invention is to take into account the slip as well in the control of the construction machine on the basis of the kinematic model.

To compensate for the slip, a correction parameter for the steering angle is introduced into the kinematic model which, in particular, corrects the influence of the weight of the concrete and its interaction with the ground surface on the steering behaviour. This correction variable can basically be determined empirically in tests depending on other variables. Depending on the side on which the concrete trough filled with concrete (milling drum, screed) is located, the correction value may be determined from the distance of the centre of gravity of the concrete trough (milling drum, paving screed) from the longitudinal axis of the machine frame, the speed of the construction machine, and the course of the trajectory. Different correction variables may be stored in the memory 17 of the position-determining device for the individual cases and used for the calculation of the position and orientation (ψ) of the construction machine on the basis of the kinematic model.

In a preferred embodiment of the invention, the correction variable available to compensate for the slip is determined during the control of the slipform paver based on the satellite signals of the navigation satellite system so that they are available to compensate for the slip in the control mode in which the control of the construction machine is not performed on the basis of the navigation satellite system. The determination of the correction variable is preferably carried out continuously so that, if the satellite signals fail, the correction quantity determined in the immediately preceding route section can be used for the directly following route section.

An embodiment that is particularly simple to implement provides for the determination of only one correction variable for the steering angle of the running gears. For this purpose, it is assumed that the steering angle of the running gears has to constantly be corrected for the entire route, i.e. it must always be counter-steered by the same angle while on the route. This angle can preferably be determined during straight travel.

The control unit of the position-determining device 13 is configured so that the subsequent routine is performed during the control of the construction machine based on the satellite signals of the navigation satellite system.

For the determination of the correction variable, the computing unit 16 analyses the course of the trajectory, i.e. it determines whether the construction machine is travelling in a straight line or in a curve. If the construction machine is to move straight ahead, i.e. if the trajectory T currently used for the control is a straight line, the setting of a steering angle of 0° is assumed for all running gears, assuming that there is no slip. For determining the correction variable, the steering angles are detected that are specified for the straight route by the controller 18 so that the construction machine moves along the trajectory T, i.e. the straight line. These steering angles are assumed to be the correction variable that is introduced into the kinematic model 16A.

In the present embodiment, it is assumed that the steering angles for all running gears do not change significantly during straight travel. Then, the resulting correction variable for the steering angle for each running gear is available. However, the correction variable may also be calculated from different steering angles set by the controller during straight travel by means of the known statistical analysis methods. In order to determine the correction variable, the computing unit 16 may calculate, for example, the mean value during straight travel from a plurality of steering angles.

The determination of the correction variable may also take place during travel along a curve. When the construction machine takes a curve, the associated steering angle is calculated using the known radius of the curve, which would be adjusted for the turning radius, assuming that there is no slip. The correction variable is the difference between the steering angle set by the controller 18 during travel along a curve and the calculated steering angle.

Another embodiment provides for the calculation of the correction variable depending on the course of the trajectory T. Thus, in the control mode in which the control of the construction machine is not performed based on the satellite signals of the navigation satellite system, correction variables for different routes, i.e. straight route sections S1 and/or curved route sections S2, are calculated and stored in the memory 17. The individual correction variables or correction factors may be assigned to specific value ranges for the corresponding steering angles, for example a first steering angle range from 0° to 20°, a second steering angle range from greater than 20° to 40°, and a third steering angle range from greater than 40°. The correction variable may also be calculated depending on the speed of the running gears 3, 4, 6. For example, different speed ranges may be assigned to each steering angle range, for example a first, second, and a third speed range, or vice versa, so that a specific correction variable results for a specific speed and a specific steering angle.

The correction variables determined are taken into account in the equation system 4.4.1 describing the kinematic model. In the present embodiment, the steering angles measured for the two front running gears and the rear running gear are corrected with the corresponding correction variable. This correction takes into account the assumption that, because of the slip during straight travel or curved travel, a counter-steering by a certain angle is required. For example, the steering angle co set by the controller 18 for the front left running gear 3 during straight travel is subtracted from the steering angle measured. Instead of a correction value, a correction factor may also be calculated with which the steering angle is multiplied. The correction may also take place with a correction function which describes a correction variable for different steering angles, for example a stronger correction for larger steering angles. The correction function may also consider different speeds of the running gears, for example, a greater correction at higher speeds. The correction of the steering angle thus also takes into account the slip in the calculation of the position and orientation (ψ) of the construction machine on the basis of the kinematic model 16A implemented in the computing unit 16 of the position-determining device 13. As a result, the position determination and thus also the control of the construction machine without the reception of the satellite signals is further improved.

If correction values for different steering angles and/or speeds are to be taken into account, the computing unit compares the measured steering angle or the measured speed of a running gear with the value ranges for steering angles and speeds and determines in which value range the steering angle or the speed lies. The correction variable assigned to the respective steering angle range or speed range is then retrieved from the memory and used for the further calculation of position and orientation (ψ).

The correction variables for the steering angle may be determined during the construction project in question preferably on a straight line S1 or on a curved route section S2 on which the construction machine had been moving before the satellite navigation failed. However, it is also possible to base the kinematic model on correction variables which were determined during other construction projects and/or with tests on test routes and stored in the memory.

Instead of the steering angle, or preferably in addition to the steering angle, the speed of the individual running gears may also be corrected with a correction variable which was previously determined during the construction project in question or other construction projects. The computing unit 16 of the position-determining device 13 is configured to determine a speed correction of the individual running gears so that the subsequent routine is performed during the control of the construction machine based on the satellite signals of the navigation satellite system.

For determining the correction variable, the speeds of the front right and left running gears 3, 4 and of the rear running gear 6 are detected by the associated speed sensors 22, 23, 24, for example during the straight travel of the construction machine. In addition, the speeds set by the controller 18 for the individual running gears 3, 4, 6, for example for straight travel, are detected and should correspond to the speeds measured by the speed sensors 22, 23, 24. The computing unit 16 calculates the difference between the set speeds and the measured speeds. This difference is used as a correction variable for the respective running gear which is taken into account in the equation system 4.4.1 describing the kinematic model.

What is claimed is:

1. A construction machine comprising:
    a machine frame supported by running gears, one or more of which are drivable and/or steerable running gears;
    steering angle sensors that are associated with one or more steerable running gears for determining the respective steering angles thereof, and speed sensors associated with one or more drivable running gears for determining the respective speeds thereof;
    a position-determining device comprising
        a navigation satellite system receiver for receiving satellite signals of a global navigation satellite system, and
        a computing unit configured to determine the position of a reference point relative to the construction machine and the orientation of the construction machine in a first machine coordinate system not dependent on the construction machine, based on the satellite signals of the global navigation satellite system; and
    a controller cooperating with the position-determining device configured to adjust steering angles of the steerable running gears so that the reference point of the construction machine moves along a set trajectory,
    wherein control of the construction machine in a first control mode is based at least in part on the satellite signals, and
    wherein the computing unit is configured so that, in a second control mode in which control of the construction machine is not based on the satellite signals of the navigation satellite system, during movement of the construction machine the position of the reference point relating to the construction machine and the orientation of the construction machine are determined in the first coordinate system based on a kinematic model implemented in the computing unit, which describes the position of the reference point and the orientation of the construction machine in the first coordinate system depending on the steering angles and the speeds of the running gears as respective inputs to the kinematic model, and further taking into account one or more empirically determined correction values for the one or more steering angles and/or for the one or more speeds,
    wherein the one or more correction values are determined to compensate for slip factors that are external to the steering angle sensors and/or speed sensors.

2. The construction machine of claim 1, wherein the position-determining device is configured so that:
    the position of the reference point and the orientation of the construction machine determined on the basis of the satellite signals of the navigation satellite system are stored in a memory, and
    the position of the reference point and the orientation of the construction machine is retrieved from the memory in the control mode on the basis of the kinematic model for determining the position of the reference point and the orientation of the construction machine.

3. The construction machine of claim 1, wherein the computing unit is configured so that, in the second control mode, the position of the reference point and the orientation of the construction machine is continuously determined at set time intervals on the basis of the kinematic model.

4. The construction machine of claim 1, wherein the computing unit is configured to model the movement of the construction machine based on the Lagrange approach.

5. The construction machine of claim 1, wherein the controller is configured so that the steering angles of the steerable running gears are adjusted to minimize the distance between a desired position described by a trajectory and an actual position of the reference point determined by the position-determining device.

6. The construction machine of claim 1, wherein the construction machine is a road milling machine having a milling drum/cutting roller equipped with milling/cutting tool, the construction machine is a slipform paver having a device for moulding flowable material, or the construction machine is a road finisher having a paving screed for moulding material.

7. The construction machine of claim 1, wherein:
    the computing unit is configured so that, in the first control mode, at least one correction variable is determined for the kinematic model based on at least one steering angle set in a certain route section for a running gear by the controller, and
    the computing unit is configured so that, in the second control mode, the position of the construction machine relating to the reference point and the orientation of the construction machine in the first coordinate system are determined on the basis of the kinematic model implemented in the computing unit of the position-determining device taking into account the at least one correction variable.

8. The construction machine of claim 7, wherein the certain route section is a straight section, and wherein the correction variable for a running gear is a steering angle set for the running gear by the controller in the straight section.

9. The construction machine of claim 7, wherein:
    the computing unit is configured so that, in the first control mode, a plurality of correction variables is determined for the kinematic model on the basis of a steering angle set in a certain route section for a running gear by the controller, depending on a type of work equipment on the left or right side of a longitudinal axis of the machine frame of the construction machine and/or a distance of the work equipment to the longitudinal axis of the machine frame and/or a condition of the ground and/or a course of the route section and/or the speed of the running gear, and the computing unit is configured so that, in the second control mode, the position of the construction machine relating to the reference point and the orientation of the construction machine are determined in the first coordinate system on the basis of the kinematic model implemented in the computing unit of the position-determining device taking into account the at least one of a plurality of correction variables.

10. The construction machine of claim 9, wherein the construction machine is a slipform paver having a device for moulding flowable material, wherein the computing unit is configured so that, in the first control mode, a plurality of correction variables is determined by the controller on the basis of a steering angle set for a running gear in a certain route section for the kinematic model depending on an arrangement of the device for moulding flowable material on a left or right side of the machine frame and/or a distance of the device for moulding flowable material from a longitudinal axis of the machine frame.

11. The construction machine of claim 1, wherein:
the computing unit is configured so that, in the first control mode, at least one correction variable is determined for the kinematic model on the basis of the difference between a speed set by the controller for a running gear and the speed of the running gear that is measured, and
the computing unit is configured so that, in the second control mode, the position of the reference point relative to the construction machine and the orientation of the construction machine in the first coordinate system is determined on the basis of the kinematic model implemented in the computing unit of the position-determining device, which describes the position of the reference point and the orientation in the first coordinate system in consideration of at least one correction variable for the speed of the at least one running gear.

12. A method of controlling a construction machine having a machine frame driven by running gears, one or more of which are drivable and/or steerable running gears, in which satellite signals of a global navigation satellite system are received, and, based on the satellite signals of the global navigation satellite system, a position of a reference point and an orientation of the construction machine are determined in a first coordinate system independent of the construction machine, and steering angles of the steerable running gears are set so that the reference point of the construction machine moves along a set trajectory, and wherein control of the construction machine in a first control mode is based at least in part on the satellite signals, the method comprising:
in a second control mode in which the control of the construction machine is not performed based on the satellite signals of the global navigation satellite system, during the movement of the construction machine, determining the position of the reference point relative to the construction machine and the orientation of the construction machine in the first coordinate system on the basis of a kinematic model implemented in a computing unit which describes the position of the reference point and the orientation of the construction machine in the first coordinate system on the basis of the steering angles and the speeds of the running gear,
wherein the kinematic model further takes into account one or more empirically determined correction values for the steering angles and/or for the speeds of the running gear, and
wherein the one or more correction values are determined to compensate for slip factors that are external to a steering angle sensor associated with the running gear for determining the steering angle.

13. The method of claim 12, wherein in the second control mode, the position of the reference point and the orientation of the construction machine is continuously determined at set time intervals on the basis of the kinematic model.

14. The method of claim 12, wherein in the second control mode, based on the kinematic model, the movement of the construction machine is modelled based on a Lagrange approach.

15. The method of claim 12, wherein the steering angle of the steerable running gears are adjusted to minimize the distance between a desired position described by a trajectory and an actual position of the reference point.

16. The method of claim 12, wherein:
in the first control mode, at least one correction variable is determined for the kinematic model based on at least one steering angle set in a certain route section for a running gear by the controller, and
in the second control mode, the position of the construction machine relating to the reference point and the orientation of the construction machine in the first coordinate system are determined on the basis of the kinematic model implemented in the computing unit of the position-determining device taking into account the at least one correction variable.

17. The method of claim 16, wherein the specific route section is a straight route section, wherein the correction variable for a running gear is a steering angle set for the running gear by the controller in the straight route section.

18. The method of claim 16, wherein:
in the first control mode, a plurality of correction variables is determined for the kinematic model on the basis of a steering angle set in a certain route section for a running gear by the controller, depending on the type of work equipment on a left or right side of the longitudinal axis of the machine frame and/or a distance of the work equipment to the longitudinal axis of the machine frame and/or a condition of the ground and/or a course of the route section and/or the speed of the running gear, and
in the second control mode, the position of the construction machine relating to the reference point and the orientation of the construction machine are determined in the first coordinate system on the basis of the kinematic model implemented in the computing unit of the position-determining device taking into account the at least one of the plurality of correction variables.

19. The method of claim 18, wherein the construction machine is a slipform paver having a device for moulding flowable material, and a plurality of correction variables is determined for the kinematic model in the control mode in which the control of the construction machine is based on the satellite signals of the global navigation satellite system on the basis of a steering angle provided in a specific route section by the controller for a running gear depending on an arrangement of the device for moulding flowable material on a left or right side of the machine frame and/or a distance of the device for moulding flowable material from a longitudinal axis of the machine frame.

20. The method of claim 12, wherein:

in the first control mode, at least one correction variable is determined for the kinematic model on the basis of the difference between a speed set by the controller for a running gear and the speed of the running gear that is measured, and in the second control mode, the position of the reference point relating to the construction machine and the orientation of the construction machine is determined in the first coordinate system on the basis of the kinematic model implemented in the computing unit of the position-determining device in consideration of at least one correction variable for the speed of the at least one running gear.

* * * * *

UNITED STATES PATENT AND TRADEMARK OFFICE
CERTIFICATE OF CORRECTION

PATENT NO. : 11,774,965 B2
APPLICATION NO. : 16/528977
DATED : October 3, 2023
INVENTOR(S) : Matthias Fritz Page 1 of 1

It is certified that error appears in the above-identified patent and that said Letters Patent is hereby corrected as shown below:

In the Specification

Column 1, Line 57:
Add a -- . -- after the word "machine"

Column 5, Line 1:
"(ii)" should be -- ($\psi$) --

Column 11, Lines 45 & 47:
"(w)" should be -- ($\psi$) --

Column 12, Line 12:
"$\delta$" should be -- $\beta$ --

Column 13, Lines 29 & 39:
"co" should be -- $\omega$ --

Column 13, Lines 65 & 67:
"co" should be -- $\varphi$ --

Column 14, Line 1:
"co" should be -- $\varphi$ --

Column 18, Line 41:
"co" should be -- $\varphi$ --

Column 18, Line 52:
"(w)" should be -- ($\psi$) --

Signed and Sealed this
Second Day of January, 2024

Katherine Kelly Vidal
*Director of the United States Patent and Trademark Office*